United States Patent
Embleton et al.

(10) Patent No.: US 11,132,038 B2
(45) Date of Patent: Sep. 28, 2021

(54) SYSTEM AND METHOD FOR THERMAL MANAGEMENT OF SHADOWED DEVICES

(71) Applicant: Dell Products L.P., Hopkinton, MA (US)

(72) Inventors: Steven Embleton, Austin, TX (US); Ben John Sy, Austin, TX (US); Eric Michael Tunks, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 32 days.

(21) Appl. No.: 16/516,300

(22) Filed: Jul. 19, 2019

(65) Prior Publication Data

US 2021/0018967 A1 Jan. 21, 2021

(51) Int. Cl.
*G06F 1/20* (2006.01)
*H04K 3/00* (2006.01)
*G06F 1/18* (2006.01)

(52) U.S. Cl.
CPC .............. *G06F 1/206* (2013.01); *G06F 1/182* (2013.01); *H04K 3/43* (2013.01)

(58) Field of Classification Search
CPC ............ G06F 1/206; G06F 1/182; H04K 3/43
See application file for complete search history.

(56) References Cited

U.S. PATENT DOCUMENTS

| | | |
|---|---|---|
| 4,785,136 A | 11/1988 | Mollet et al. |
| 4,858,309 A | 8/1989 | Korsunsky et al. |
| 4,871,220 A | 10/1989 | Kohin |
| 5,049,701 A | 9/1991 | Vowles et al. |
| 5,084,802 A | 1/1992 | Nguyenngoc |
| 5,250,752 A | 10/1993 | Cutright |
| 5,294,748 A | 3/1994 | Schwenk et al. |
| 5,323,298 A | 6/1994 | Shatas et al. |
| 5,437,560 A | 8/1995 | Mizuguchi |
| 5,545,844 A | 8/1996 | Plummer, III et al. |
| 5,649,831 A | 7/1997 | Townsend |
| 5,762,513 A | 6/1998 | Stine |
| 5,812,370 A | 9/1998 | Moore et al. |
| 5,943,218 A | 8/1999 | Liu |
| 6,011,221 A | 1/2000 | Lecinski et al. |
| 6,038,130 A | 3/2000 | Boeck et al. |
| 6,045,385 A | 4/2000 | Kane |

(Continued)

OTHER PUBLICATIONS

Gary Fenical; "Rule-of-Thumb for Calculating Aperture Size"; Laird Technologies; Mar. 2003 (http://cdn.lairdtech.com/home/brandworld/files/EMI%20Rule-of-Thumb%20for%20Calculating%20Aperture%20Size%20Technical%20Note%Download.pdf).

(Continued)

*Primary Examiner* — Mark A Connolly
(74) *Attorney, Agent, or Firm* — Chamberlain, Hrdlicka, White, Williams & Aughtry

(57) ABSTRACT

A data processing device includes a persistent storage for storing a state repository and a state manager. The state manager updates a portion of the state repository associated with a row of devices based on states of the devices to obtain an updated state repository; makes a first determination that the portion indicates a thermal issue; in response to the first determination: makes a second determination that the thermal issue cannot be addressed using a gas flow; and in response to the second determination: modifies a power state of at least one of the devices in the row to address the thermal issue.

20 Claims, 19 Drawing Sheets

(56) References Cited

U.S. PATENT DOCUMENTS

| | | | |
|---|---|---|---|
| 6,068,009 A | 5/2000 | Paes et al. | |
| 6,176,727 B1 | 1/2001 | Liu et al. | |
| 6,208,514 B1 | 3/2001 | Stark et al. | |
| 6,225,554 B1 | 5/2001 | Trehan et al. | |
| 6,242,690 B1 | 6/2001 | Glover | |
| 6,269,001 B1 | 7/2001 | Matteson et al. | |
| 6,331,940 B1 | 12/2001 | Lin | |
| 6,332,792 B1 | 12/2001 | Lin et al. | |
| 6,370,036 B1 | 4/2002 | Boe | |
| 6,377,451 B1 | 4/2002 | Furuya | |
| 6,437,987 B1 | 8/2002 | Lin | |
| 6,517,369 B1 | 2/2003 | Butterbaugh et al. | |
| 6,613,977 B1 | 9/2003 | Fowler | |
| 6,657,214 B1 | 12/2003 | Foegelle et al. | |
| 6,695,630 B1 | 2/2004 | Ku | |
| 6,870,092 B2 | 3/2005 | Lambert et al. | |
| 6,947,290 B2 | 9/2005 | Hirata | |
| 7,035,087 B2 | 4/2006 | Tan | |
| 7,075,796 B1 | 7/2006 | Pritchett | |
| 7,133,296 B2 | 11/2006 | Choi et al. | |
| 7,287,996 B1 | 10/2007 | Shing | |
| 7,371,097 B1 | 5/2008 | Pennypacker et al. | |
| 7,371,977 B1 | 5/2008 | Preonas | |
| 7,692,934 B2 | 4/2010 | Bartscher et al. | |
| 7,695,313 B2 | 4/2010 | Karim et al. | |
| 7,757,847 B2 | 7/2010 | Tang et al. | |
| 8,059,414 B2 | 11/2011 | Wei | |
| 8,098,492 B2 | 1/2012 | Rosenberg et al. | |
| 8,243,469 B2 | 8/2012 | Jaze et al. | |
| 8,310,834 B2 | 11/2012 | Fürholzer | |
| 8,530,756 B1 | 9/2013 | Winch | |
| 8,636,526 B2 | 1/2014 | Funamura et al. | |
| 8,642,900 B2 | 2/2014 | Nordling et al. | |
| 8,662,295 B2 | 3/2014 | Kubota et al. | |
| 8,687,374 B2 | 4/2014 | Watanabe et al. | |
| 8,720,682 B2 | 5/2014 | Navon et al. | |
| 8,760,859 B2 | 6/2014 | Fuchs et al. | |
| 8,969,738 B2 | 3/2015 | Ross | |
| 9,019,711 B2 | 4/2015 | Tamura | |
| 9,095,045 B2 | 7/2015 | Rojo et al. | |
| 9,370,132 B2 | 6/2016 | Coppola | |
| 9,497,894 B1 | 11/2016 | Ramsey | |
| 9,549,480 B1 | 1/2017 | Besterman | |
| 9,585,270 B2 | 2/2017 | Yang et al. | |
| 9,603,280 B2 | 3/2017 | Frank et al. | |
| 9,607,660 B2 | 3/2017 | Bennett, II et al. | |
| 9,640,910 B1 | 5/2017 | Chien et al. | |
| 9,642,290 B2 | 5/2017 | Anderson et al. | |
| 9,820,404 B1 | 11/2017 | Wu et al. | |
| 9,829,939 B1 | 11/2017 | Lien et al. | |
| 9,930,816 B2 | 3/2018 | Winch et al. | |
| 10,007,309 B1* | 6/2018 | Imwalle | H05K 7/20836 |
| 10,249,984 B1 | 4/2019 | Rask | |
| 10,364,031 B2 | 7/2019 | Goupil | |
| 10,420,258 B1 | 9/2019 | Rahilly et al. | |
| 10,477,740 B2 | 11/2019 | Coppola | |
| 10,477,741 B1 | 11/2019 | Bae et al. | |
| 10,492,324 B2 | 11/2019 | Miura | |
| 10,520,532 B2 | 12/2019 | Lee | |
| 10,541,519 B1 | 1/2020 | Wavering | |
| 10,542,642 B2 | 1/2020 | Babhadiashar et al. | |
| 10,575,443 B2 | 2/2020 | Woodbury, II et al. | |
| 10,707,636 B2 | 7/2020 | Yamamoto | |
| 10,720,722 B2 | 7/2020 | Tsorng et al. | |
| 10,734,763 B2 | 8/2020 | M R et al. | |
| 2002/0000645 A1 | 1/2002 | Sato et al. | |
| 2002/0001181 A1 | 1/2002 | Kondo | |
| 2002/0027769 A1 | 3/2002 | Kasahara et al. | |
| 2002/0064035 A1 | 5/2002 | Mair et al. | |
| 2003/0011988 A1 | 1/2003 | Irmer | |
| 2003/0057131 A1 | 3/2003 | Diaferia | |
| 2003/0137811 A1 | 7/2003 | Ling et al. | |
| 2003/0174474 A1 | 9/2003 | Mair et al. | |
| 2003/0174487 A1 | 9/2003 | Garmong | |
| 2006/0025010 A1 | 2/2006 | Spitaels et al. | |
| 2007/0105445 A1 | 5/2007 | Manto et al. | |
| 2007/0147013 A1 | 6/2007 | Robbins | |
| 2008/0076291 A1 | 3/2008 | Ewing et al. | |
| 2009/0021925 A1 | 1/2009 | Heimann | |
| 2009/0095523 A1 | 4/2009 | Stevenson | |
| 2009/0146862 A1 | 6/2009 | Malone | |
| 2010/0117579 A1* | 5/2010 | Culbert | G06F 1/10 318/471 |
| 2010/0208433 A1 | 8/2010 | Heimann et al. | |
| 2010/0285636 A1 | 11/2010 | Chen | |
| 2010/0319981 A1 | 12/2010 | Kapusta et al. | |
| 2011/0011760 A1 | 1/2011 | Habersetzer | |
| 2011/0198245 A1 | 8/2011 | Soufan | |
| 2011/0222249 A1 | 9/2011 | Ruehl et al. | |
| 2011/0232956 A1 | 9/2011 | Ramsey | |
| 2012/0011700 A1 | 1/2012 | Kelaher et al. | |
| 2012/0044653 A1 | 2/2012 | Morris et al. | |
| 2012/0073873 A1 | 3/2012 | Nash | |
| 2012/0116590 A1* | 5/2012 | Florez-Larrahondo | G06F 1/206 700/275 |
| 2012/0178364 A1 | 7/2012 | Dobyns | |
| 2012/0285738 A1 | 11/2012 | Cochrane et al. | |
| 2013/0160563 A1 | 6/2013 | Dingler et al. | |
| 2013/0194772 A1 | 8/2013 | Rojo et al. | |
| 2013/0206470 A1 | 8/2013 | Davis | |
| 2013/0258582 A1* | 10/2013 | Shelnutt | G05D 23/1927 361/679.48 |
| 2013/0277520 A1 | 10/2013 | Funk et al. | |
| 2014/0008119 A1 | 1/2014 | Brandt | |
| 2014/0138388 A1 | 5/2014 | Synnestvedt | |
| 2014/0368821 A1 | 12/2014 | Gazaway et al. | |
| 2015/0014912 A1 | 1/2015 | Ivey et al. | |
| 2015/0245529 A1 | 8/2015 | Tam et al. | |
| 2015/0257310 A1* | 9/2015 | DeSouza | H05K 7/20836 361/679.46 |
| 2015/0271959 A1 | 9/2015 | Chen et al. | |
| 2015/0368423 A1 | 12/2015 | Yamauchi et al. | |
| 2015/0373869 A1 | 12/2015 | Macerini et al. | |
| 2016/0081231 A1* | 3/2016 | Berke | G06F 1/206 700/299 |
| 2016/0111814 A1 | 4/2016 | Hirano et al. | |
| 2016/0159480 A1 | 6/2016 | Barth | |
| 2016/0182130 A1 | 6/2016 | Ahmed et al. | |
| 2016/0372948 A1 | 12/2016 | Kvols | |
| 2016/0381818 A1 | 12/2016 | Mills et al. | |
| 2017/0347496 A1 | 11/2017 | Smith | |
| 2018/0062287 A1 | 3/2018 | Shaw et al. | |
| 2018/0257334 A1 | 9/2018 | Motoyanagi et al. | |
| 2019/0008079 A1 | 1/2019 | Kondo et al. | |
| 2019/0050030 A1 | 2/2019 | Baum | |
| 2019/0056439 A1 | 2/2019 | Lee | |
| 2019/0159371 A1 | 5/2019 | Grinsteinner | |
| 2019/0230828 A1 | 7/2019 | Murch | |
| 2019/0304922 A1 | 10/2019 | Maruthamuthu et al. | |
| 2019/0353356 A1 | 11/2019 | Fischer | |
| 2019/0379183 A1 | 12/2019 | Winsor | |
| 2020/0187394 A1 | 6/2020 | Murugesan | |
| 2020/0187578 A1 | 6/2020 | Sadato | |
| 2020/0313584 A1 | 10/2020 | Morel et al. | |

OTHER PUBLICATIONS

"Full HD Endoscopes"; joimax® GmbH, May 1, 2019; https://web.archive.org/web/20190501003355/https://www.ioimax.com/en/products/electronic-devices/hd_endoscopes/.

"JRE 0814 RF Shielded Test Enclosure"; JRE Test, LLC, Apr. 22, 2019; https://web.archive.org/web/20190422094016/https://jretest.com/product/jre-0814/.

"Tapster"; Tapster Robotics, Inc., Sep. 30, 2017; https://web.archive.org/web/20170930111059/https://www.tapster.io/.

\* cited by examiner

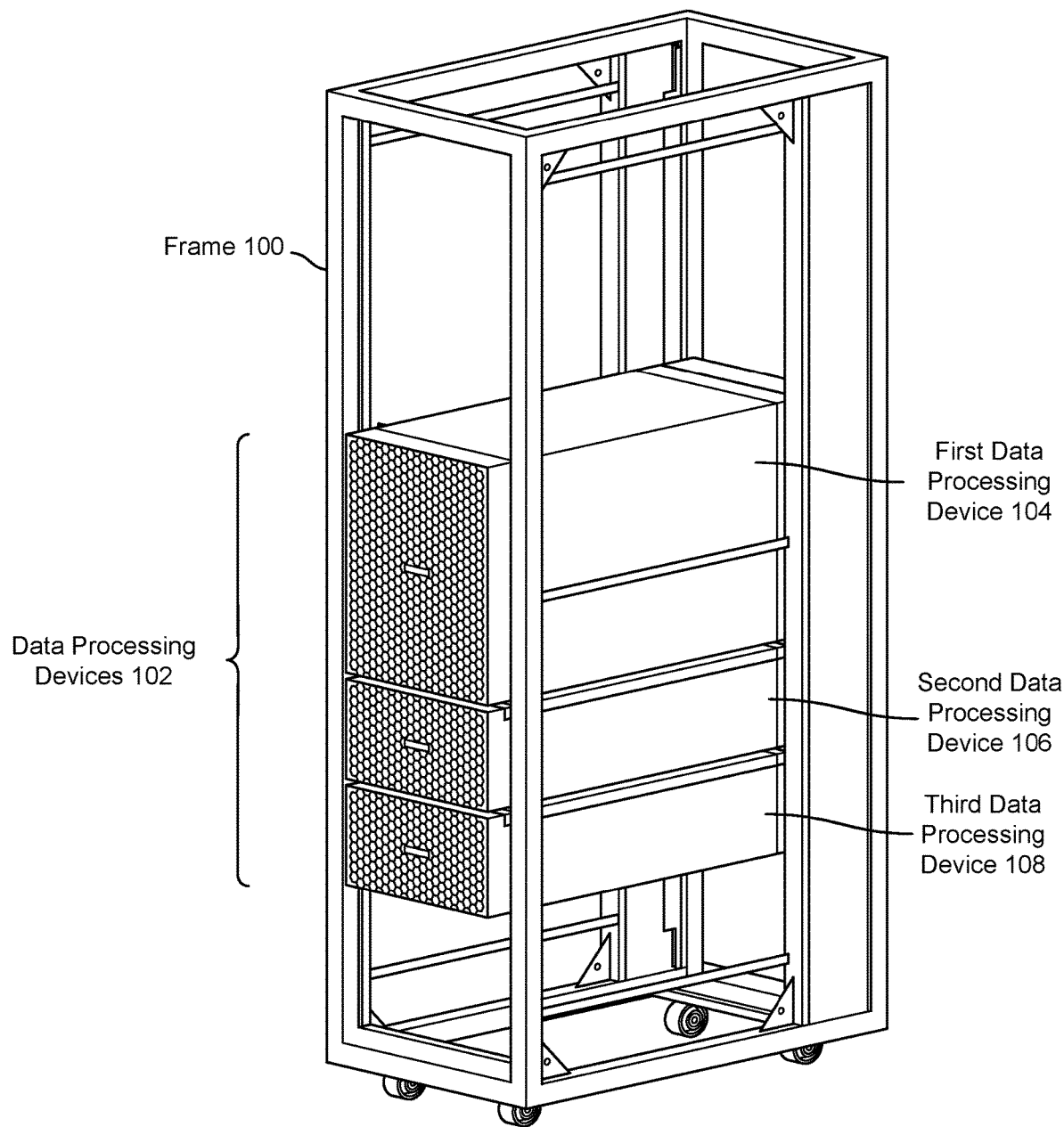
FIG. 1.1

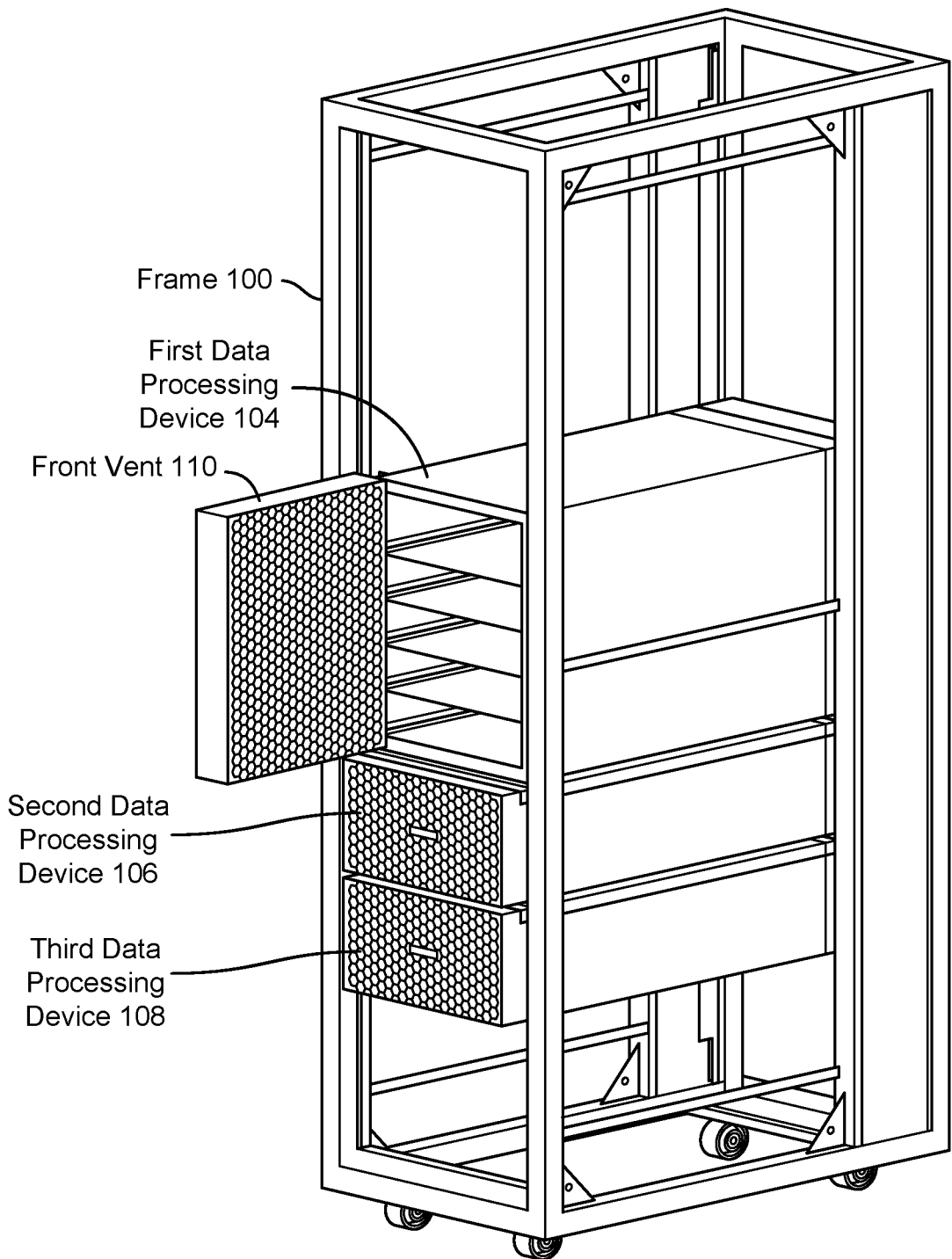
FIG. 1.2

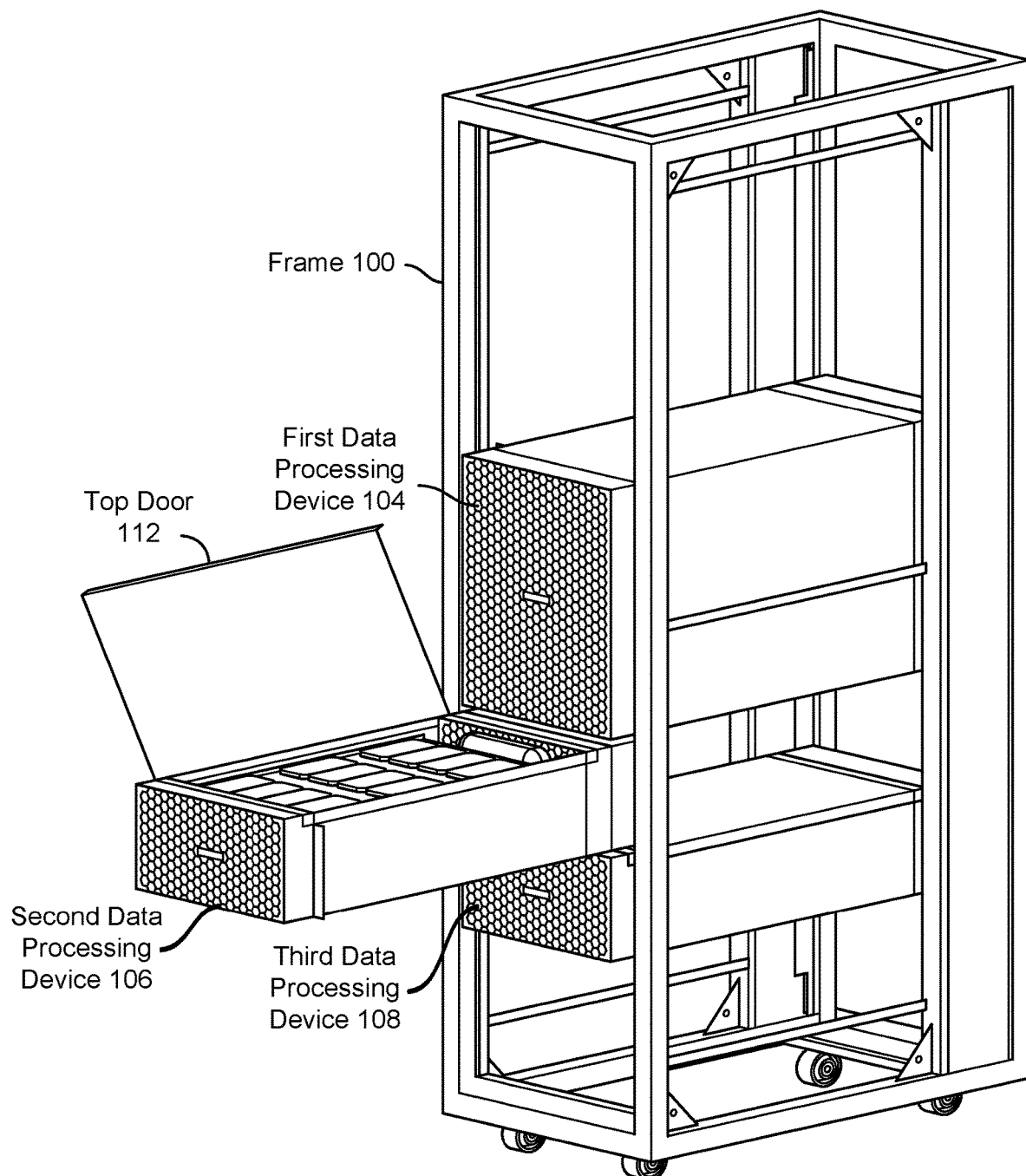
FIG. 1.3

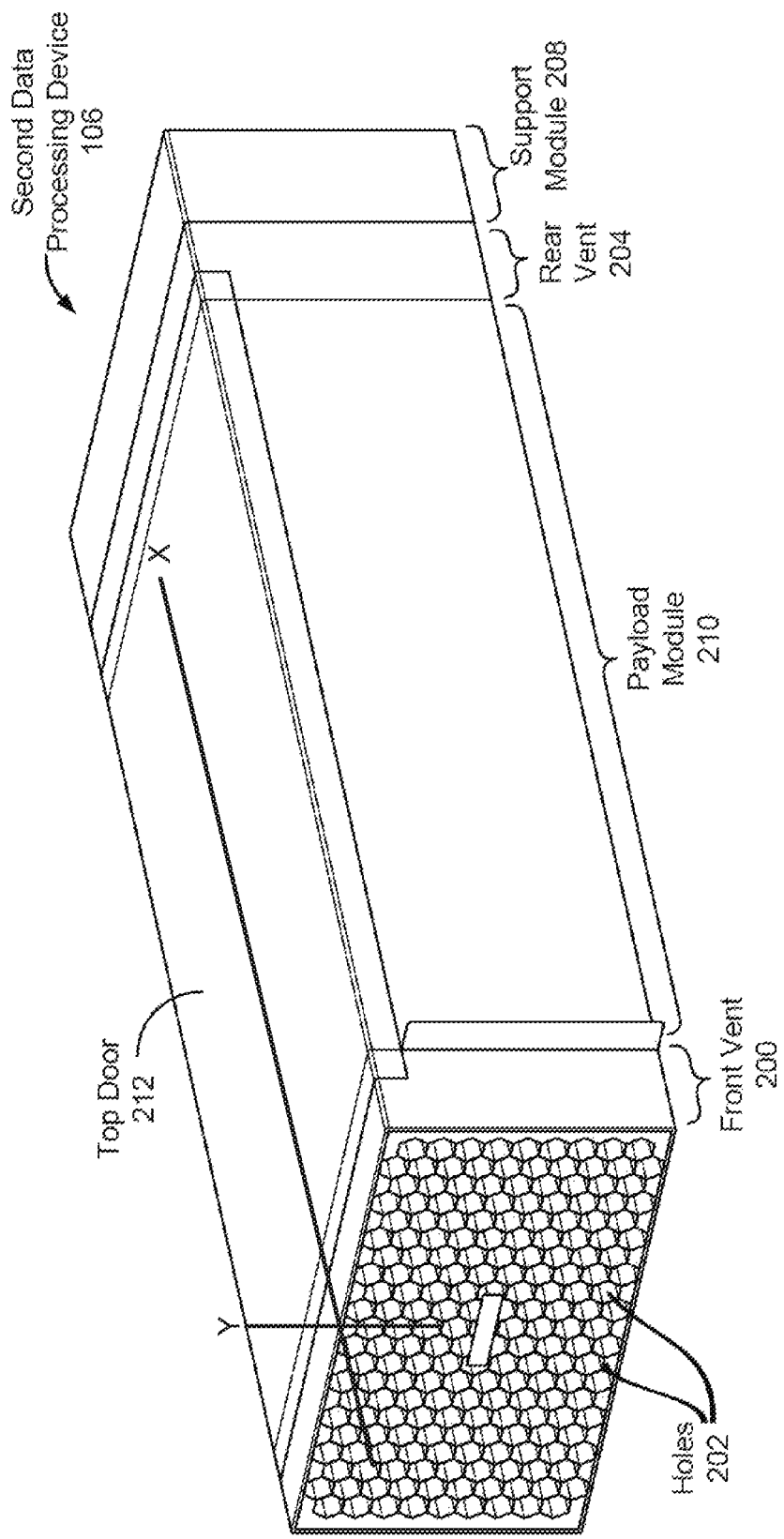
FIG. 2.1

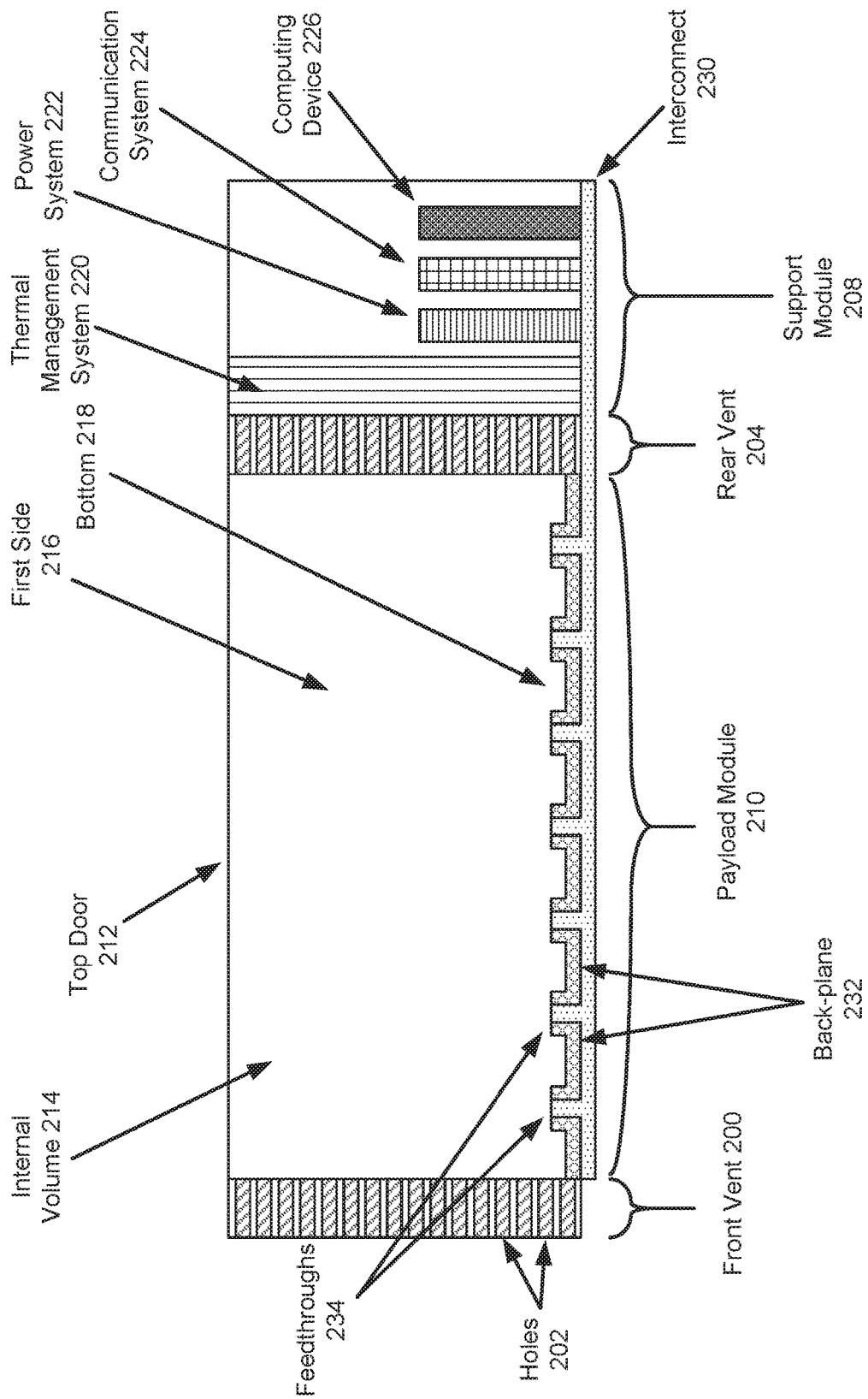
FIG. 2.2

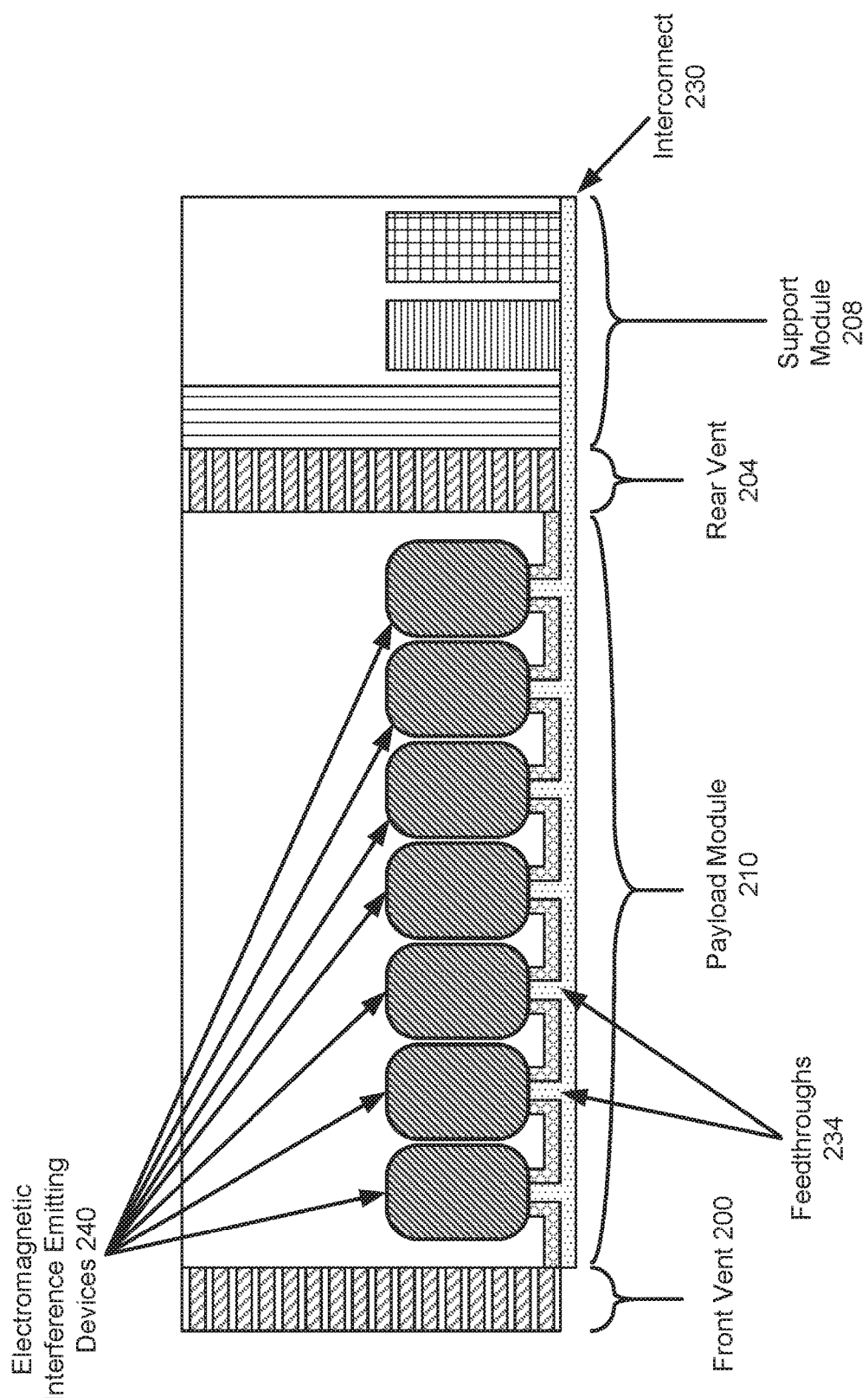
FIG. 2.3

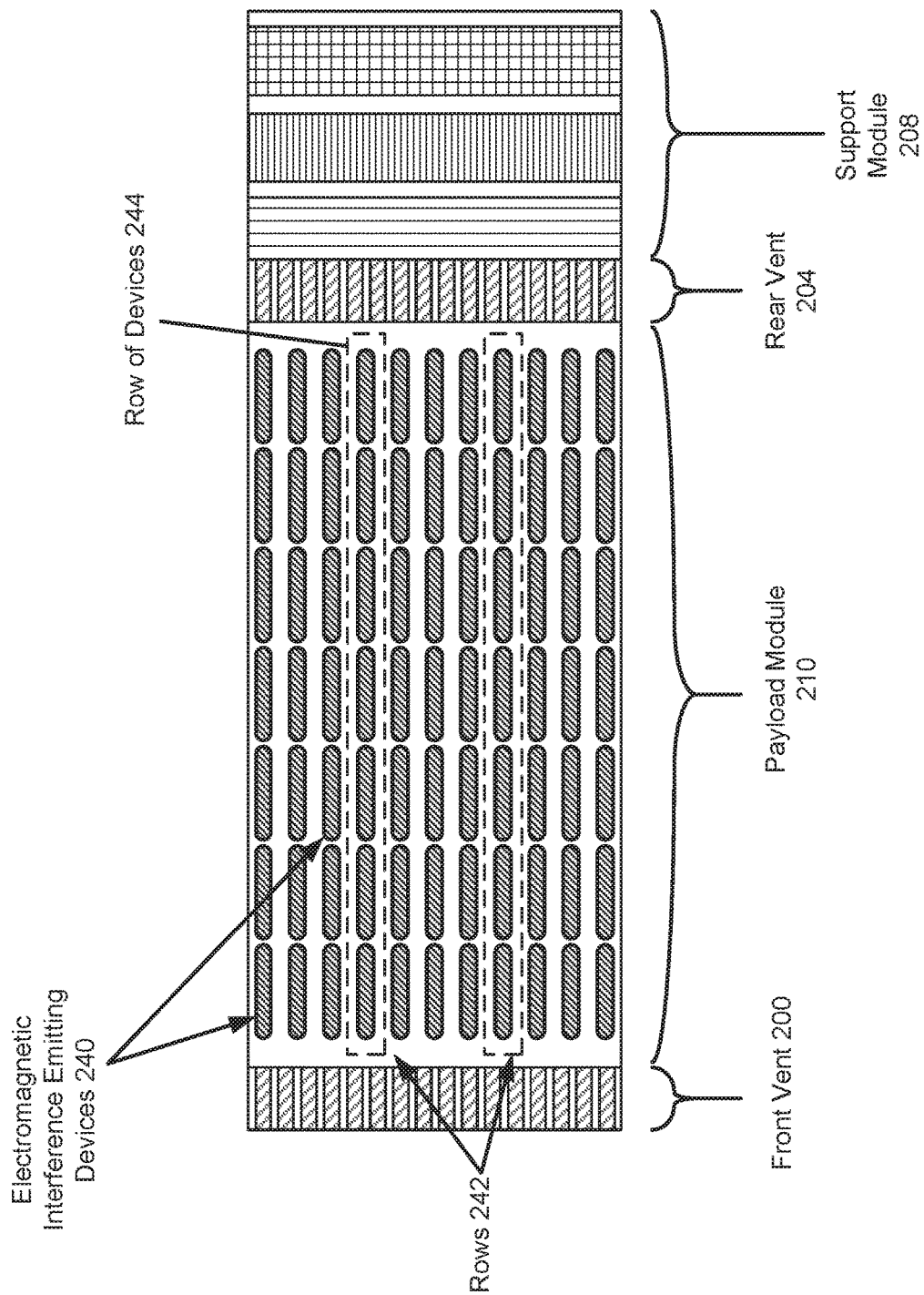
FIG. 2.4

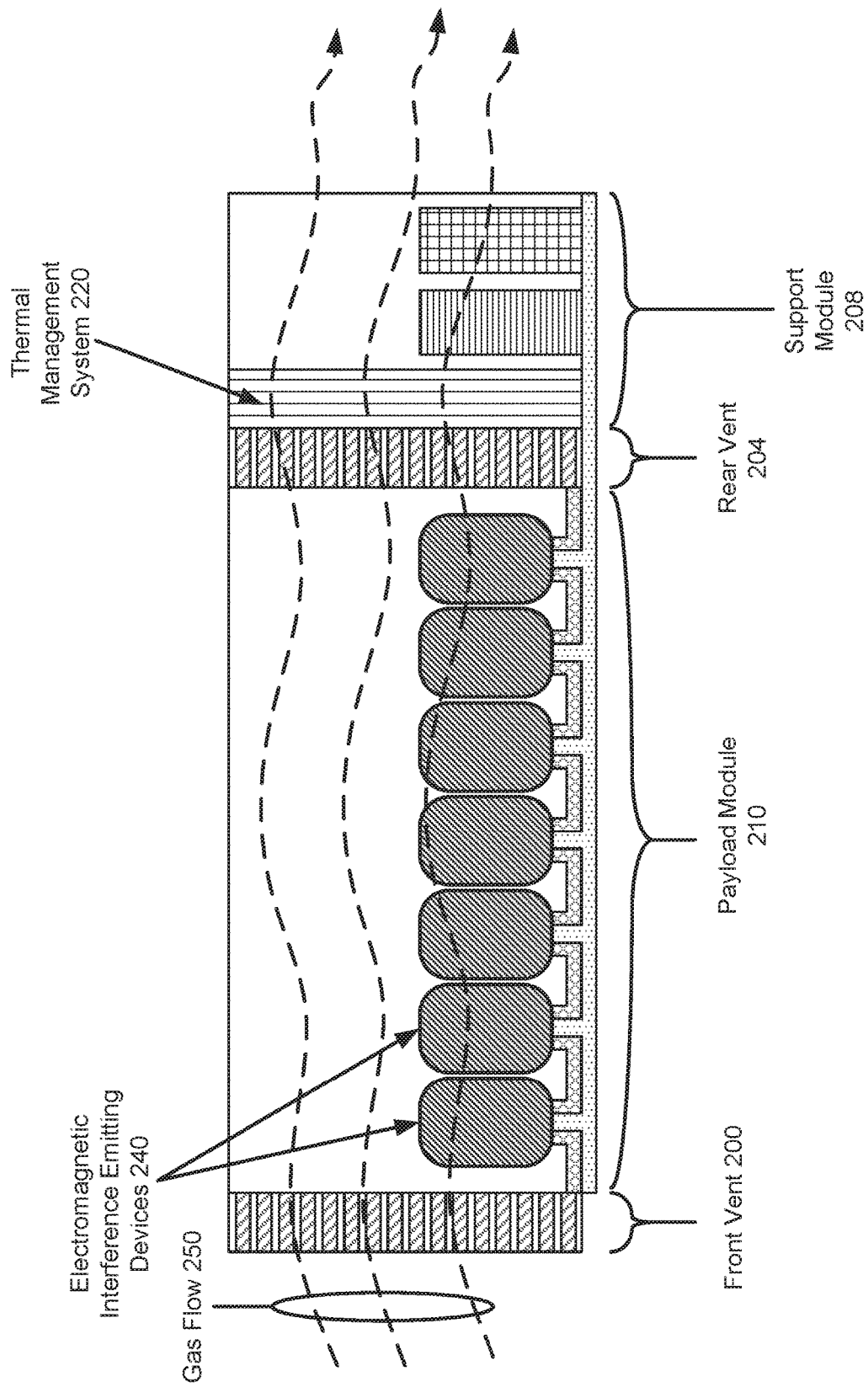
FIG. 2.5

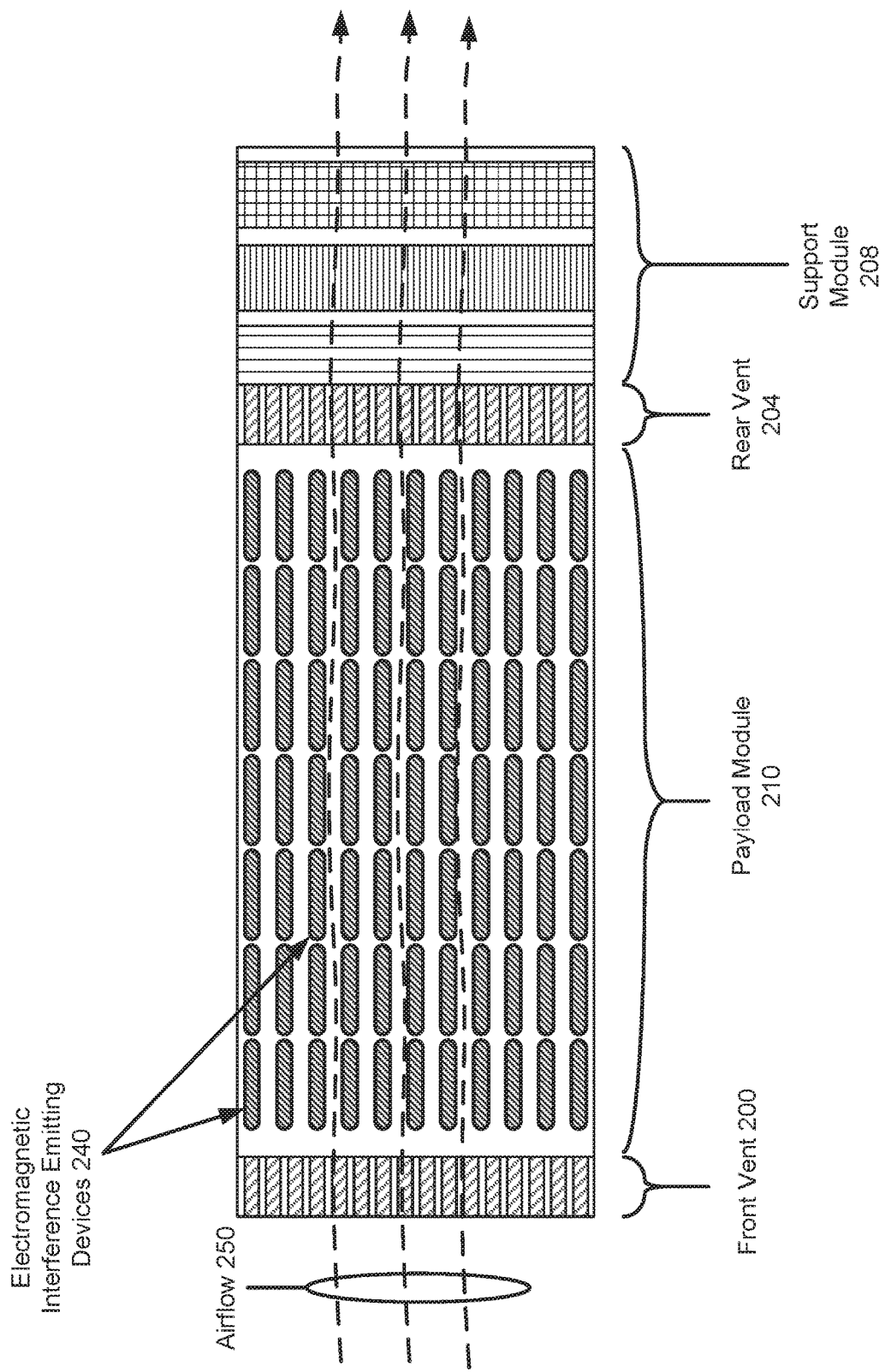
FIG. 2.6

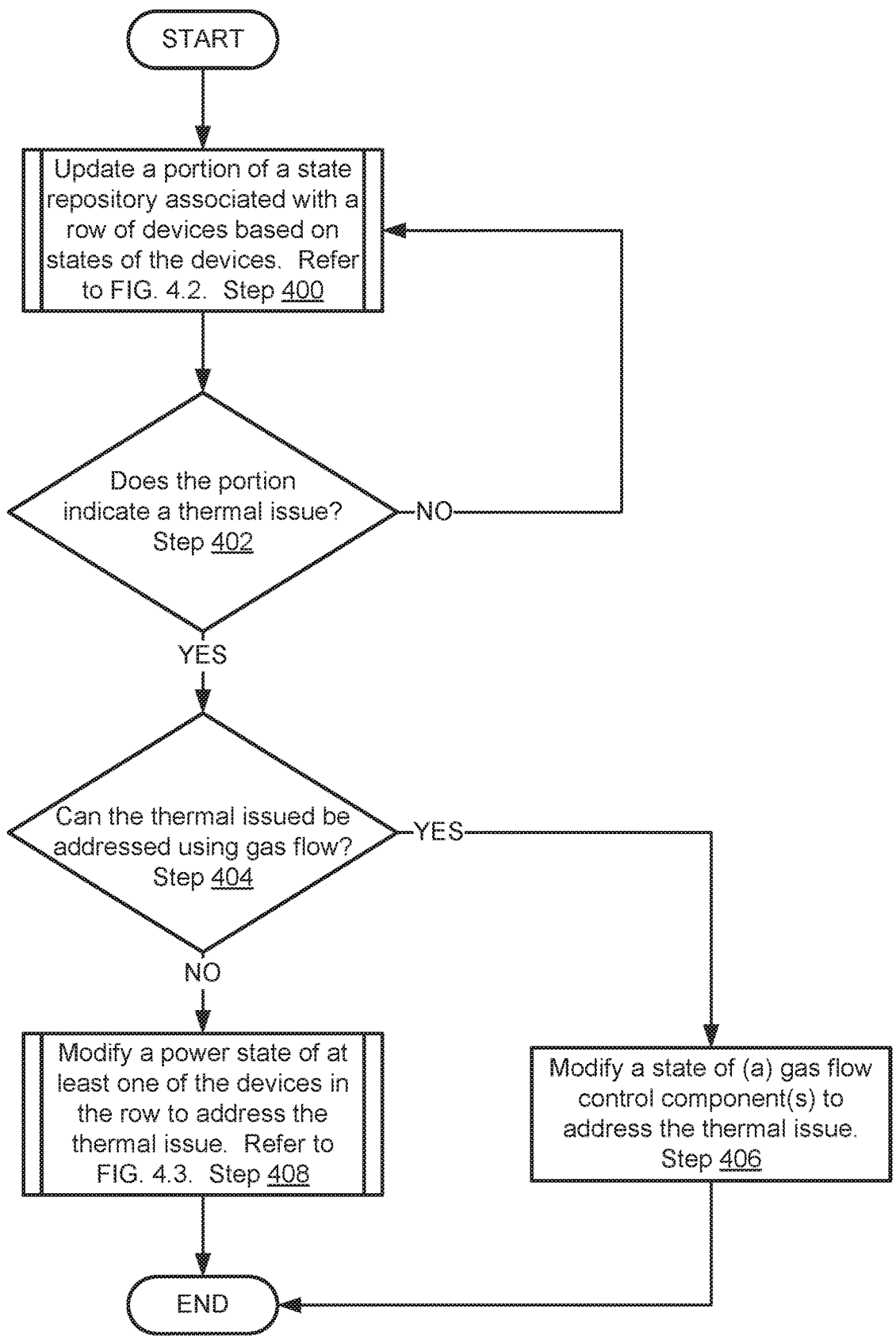
FIG. 4.1

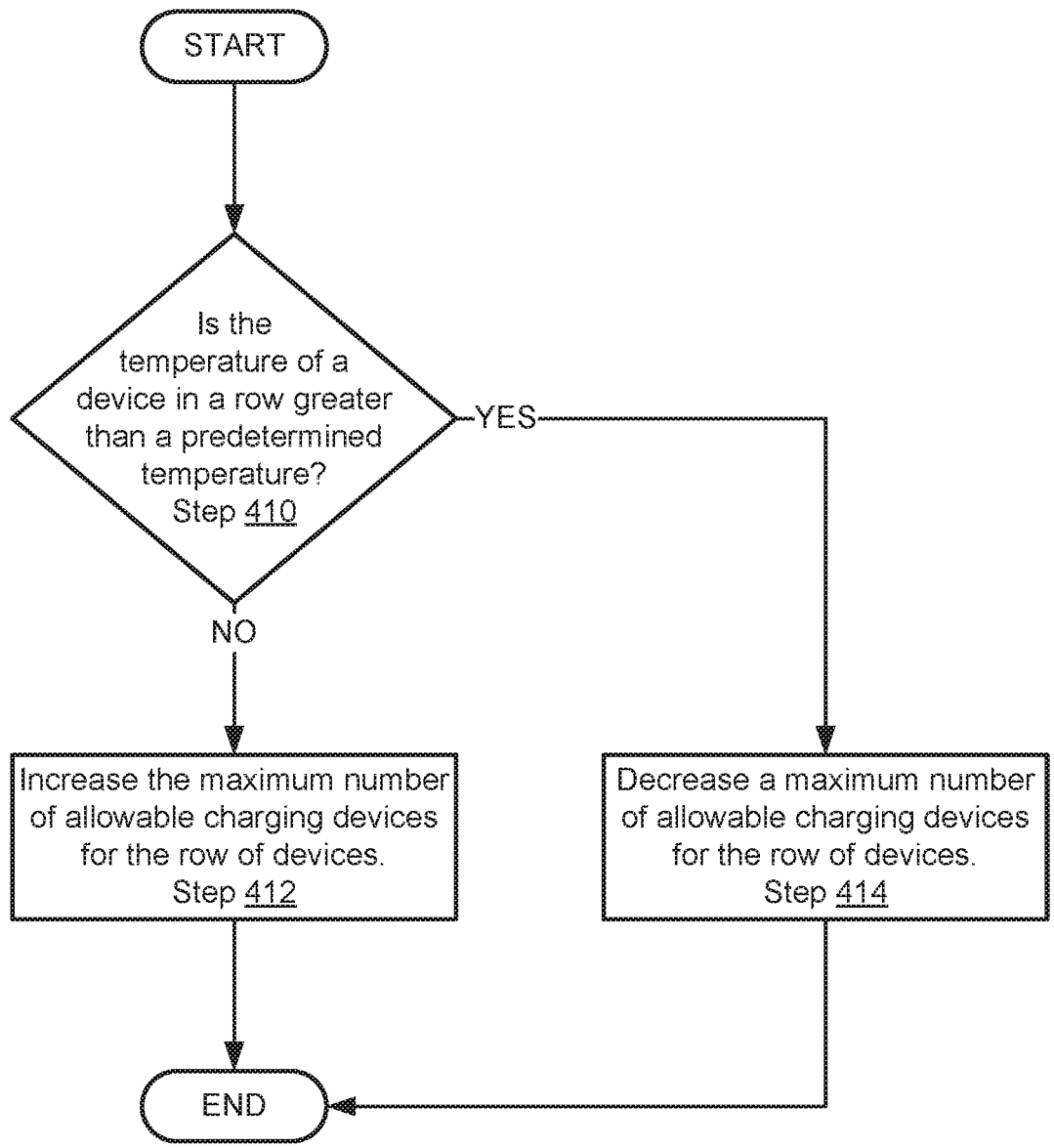
FIG. 4.2

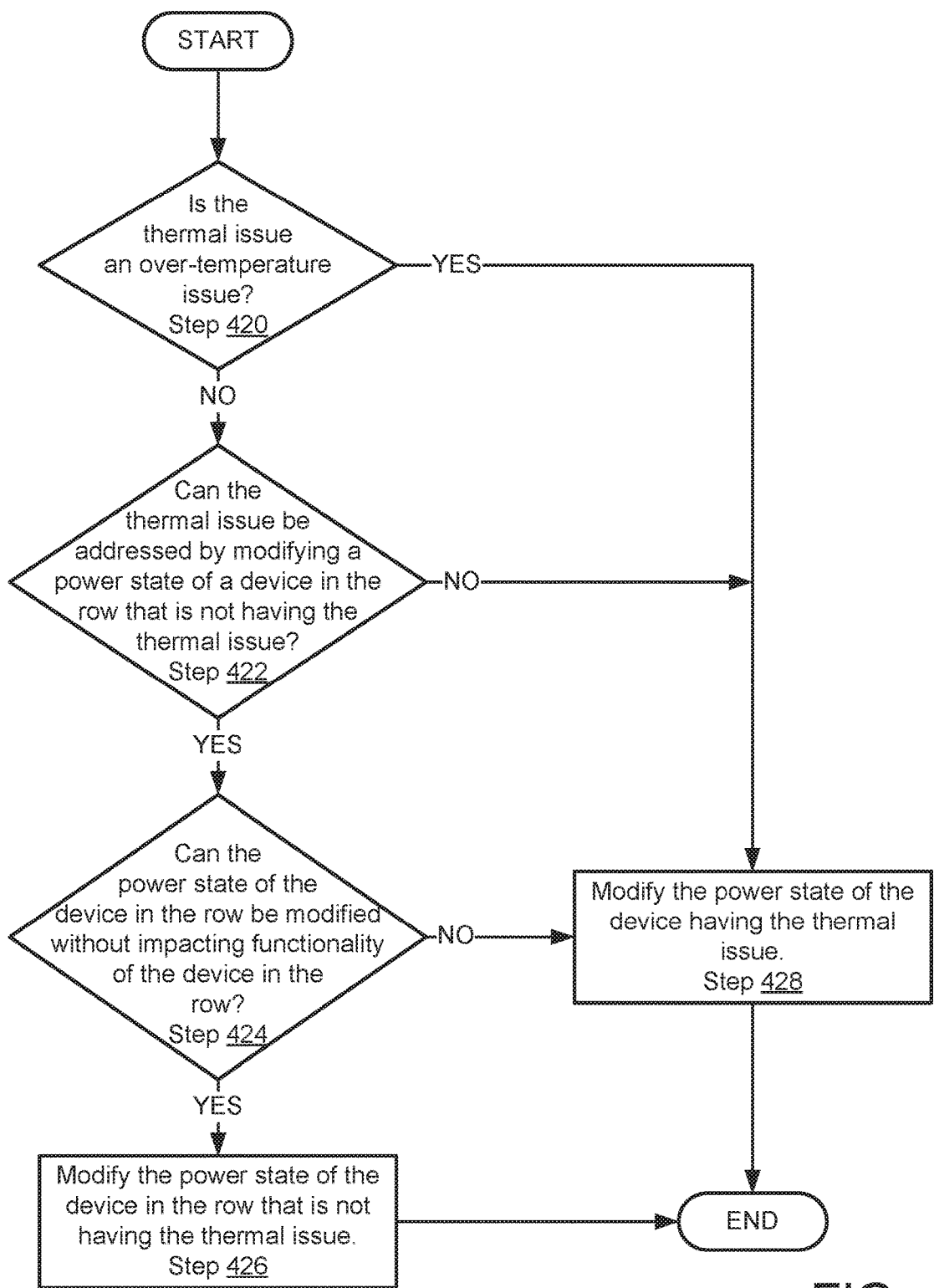
FIG. 4.3

FIG. 6.1

|  | Power State | Thermal State | Maximum |
|---|---|---|---|
| First Device 600 | Low | 22° |  |
| Second Device 602 | Low | 22° |  |
| Third Device 604 | Low | 22° |  |
| Fourth Device 606 | Low | 22° | 3 |
| Fifth Device 608 | Low | 22° |  |
| Sixth Device 610 | Low | 22° |  |
| Eight Device 612 | Low | 22° |  |

FIG. 6.2

|  | Power State | Thermal State | Maximum |
|---|---|---|---|
| First Device 600 | Low | 22° |  |
| Second Device 602 | High | 24° |  |
| Third Device 604 | Low | 26° |  |
| Fourth Device 606 | High | 24° | 3 |
| Fifth Device 608 | Low | 23° |  |
| Sixth Device 610 | Low | 22° |  |
| Eight Device 612 | Low | 22° |  |

FIG. 6.3

|  | Power State | Thermal State | Maximum |
|---|---|---|---|
| First Device 600 | High | 26° | |
| Second Device 602 | High | 32° | |
| Third Device 604 | Low | 38° | |
| Fourth Device 606 | High | 32° | 2 |
| Fifth Device 608 | Low | 27° | |
| Sixth Device 610 | Low | 25° | |
| Eight Device 612 | Low | 22° | |

FIG. 6.4

|  | Power State | Thermal State | Maximum |
|---|---|---|---|
| First Device 600 | High | 26° | |
| Second Device 602 | High | 32° | |
| Third Device 604 | Low | 38° | |
| Fourth Device 606 | Low | 27° | 2 |
| Fifth Device 608 | Low | 26° | |
| Sixth Device 610 | Attempt High | 25° | |
| Eight Device 612 | Low | 22° | |

FIG. 6.5

|  | Power State | Thermal State | Maximum |
| --- | --- | --- | --- |
| First Device 600 | High | 22° |  |
| Second Device 602 | High | 26° |  |
| Third Device 604 | Low | 28° |  |
| Fourth Device 606 | Low | 25° | 3 |
| Fifth Device 608 | Low | 23° |  |
| Sixth Device 610 | High | 26° |  |
| Eight Device 612 | Low | 22° |  |

FIG. 6.6

SYSTEM AND METHOD FOR THERMAL MANAGEMENT OF SHADOWED DEVICES

BACKGROUND

High density environment may include devices that are tightly packed together. In other words, the devices may be physically close to each other. Such an environment presents numerous challenges relating to thermal management, mechanical positioning and orienting of devices, and electrical concerns related to power and operation of such devices.

SUMMARY

In one aspect, a data processing device in accordance with one or more embodiments of the invention includes a persistent storage for storing a state repository and a state manager. The state manager updates a portion of the state repository associated with a row of devices based on states of the devices to obtain an updated state repository; makes a first determination that the portion indicates a thermal issue; in response to the first determination: makes a second determination that the thermal issue cannot be addressed using a gas flow; and in response to the second determination: modifies a power state of at least one of the devices in the row to address the thermal issue.

In one aspect, a method for managing a data processing device in accordance with one or more embodiments of the invention includes updating a portion of a state repository associated with a row of devices, disposed in the data processing device, based on states of the devices to obtain an updated state repository; making a first determination that the portion indicates a thermal issue; in response to the first determination: making a second determination that the thermal issue cannot be addressed using a gas flow; and in response to the second determination: modifying a power state of at least one of the devices in the row to address the thermal issue.

In one aspect, a non-transitory computer readable medium in accordance with one or more embodiments of the invention stores computer instructions that, when executed by a processor, cause a data processing device to perform a method, the method includes updating a portion of a state repository associated with a row of devices, disposed in the data processing device, based on states of the devices to obtain an updated state repository; making a first determination that the portion indicates a thermal issue; in response to the first determination: making a second determination that the thermal issue cannot be addressed using a gas flow; and in response to the second determination: modifying a power state of at least one of the devices in the row to address the thermal issue.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of an example system in accordance with one or more embodiments of the invention.

FIG. 1.2 shows a diagram of the example system of FIG. 1.1 in a first configuration in accordance with one or more embodiments of the invention.

FIG. 1.3 shows a diagram of the example system of FIG. 1.1 in a second configuration in accordance with one or more embodiments of the invention.

FIG. 2.1 shows a diagram of a second data processing device in accordance with one or more embodiments of the invention.

FIG. 2.2 shows a first cross section diagram of the data processing device of FIG. 2.1.

FIG. 2.3 shows a second cross section diagram of the data processing device of FIG. 2.1.

FIG. 2.4 shows a third cross section diagram of the data processing device of FIG. 2.1.

FIG. 2.5 shows a fourth cross section diagram of the data processing device of FIG. 2.1.

FIG. 2.6 shows a fifth cross section diagram of the data processing device of FIG. 2.1.

FIG. 4.1 shows a flowchart of a method of managing a thermal state in accordance with one or more embodiments of the invention.

FIG. 4.2 shows a flowchart of a method of updating a state repository in accordance with one or more embodiments of the invention, FIG. 4.3 shows a flowchart of a method of modifying a power state in accordance with one or more embodiments of the invention.

FIGS. 6.2-6.6 show diagrams of state information associated with the data processing device of FIG. 6.1 over time.

DETAILED DESCRIPTION

Figure 3:
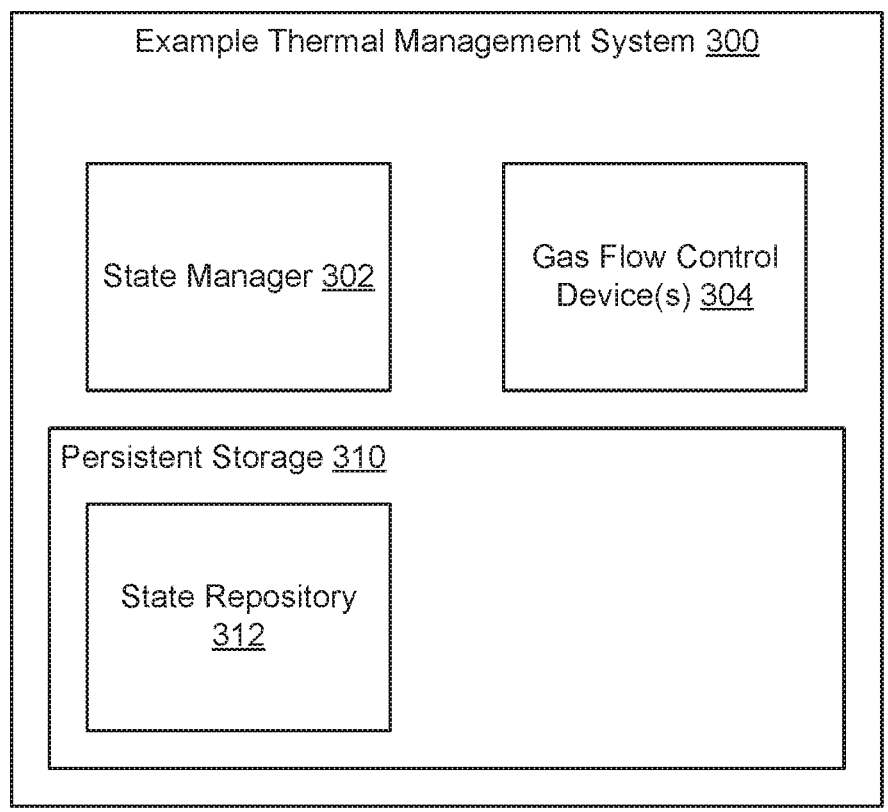
FIG. 3 shows a thermal management system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing electromagnetic interference in a high-density environment. Specifically, embodiments of the invention may provide a system that manages electromagnetic interference at a data processing device level. By doing so, embodiments of the invention may facilitate the inclusion of devices that emit electromagnetic interference in a high-density environment while mitigating the impact of electromagnetic interference generated by the devices.

In one or more embodiments of the invention, a data processing device includes an internal volume for housing any number of devices. The data processing device may isolate the electromagnetic interference generated by the devices from the ambient environment proximate to the data processing device by at least 90 decibels (or another desirable level of electromagnetic interference suppression). The data processing devices may also facilitate the insertion, removal, and/or modification of the devices while maintaining the electromagnetic isolation of the aforementioned devices from the ambient environment. By doing so, such electromagnetic interference emitting devices may be utilized, in a high-density setting, while mitigating the potential impact on the high-density environment of inclusion of such devices.

In one or more embodiments of the invention, a data processing device manages the respective power states and thermal states of the devices concurrently. When disposed in the internal volume, the thermal states of the respective devices may be impacted by the power states of the other devices due to shadowing effects caused by the internal volume. Consequently, managing of the respective power states of the devices along with the thermal states may reduce the likelihood of the devices entering an undesirable thermal and/or power state.

FIG. 1.1 shows an example system in accordance with one or more embodiments of the invention. The system may include a frame (100) and any number of data processing devices (102). The components of the example system may provide electromagnetic interference management services for devices disposed within the data processing devices (102). By doing so, devices that emit electromagnetic interference may be utilized in a high-density computing environment without negatively impacting the high-density computing environment.

For example, one or more electromagnetic interference emitting devices may be disposed within one or more of the data processing devices (102). The system illustrated in FIG. 1.1 may manage the electromagnetic interference generated by the one or more electromagnetic interference emitting devices by (i) limiting the space in which electromagnetic interference is allowed to freely propagate and/or (ii) attenuating the electromagnetic interference as it propagates out of the limited space.

To do so, the system of FIG. 1.1 may reduce the strength of the electromagnetic interference when propagating from inside of a portion of the data processing devices (102) to an ambient environment around the data processing devices (102) and/or other locations by at least 90 decibels. For example, a data processing device in accordance with embodiments of the invention may provide greater than 35 decibels of isolation, between 35-50 decibels of isolation, between 50-65 decibels of isolation, between 65-80 decibels of isolation, and/or greater than 80 decibels of isolation.

The electromagnetic interference isolation provided by the data processing devices (102) may have a frequency dependent response. For example, the data processing devices (102) may provide at least 90 decibels (dB), or another suitable level of isolation, across a frequency band in which devices that may be disposed within the data processing devices (102) are adapted to emit electromagnetic interference. In other frequency bands, the data processing devices (102) may provide different level or no electromagnetic interference isolation for devices disposed within the data processing devices (102).

Accordingly, a data processing device in accordance with one or more embodiments of the invention may provide electromagnetic interference suppression services that are frequency dependent. In one or more embodiments of the invention, a data processing device provides electromagnetic interference isolation by reducing the strength of electromagnetic interference across at least one frequency band by a predetermined amount (e.g., 90 decibels).

An electromagnetic interference emitting device may be any type of hardware device that intentionally emits electromagnetic radiation as part of its operation. The emissions of electromagnetic radiation may be, for example, continuous, periodic, or intermittent (e.g., at any point in time based on the operation of the respective electromagnetic interference emitting device). An electromagnetic interference emitting device may be, for example, a personal electronic device such as a cellular device (e.g., smart phone, cell phone, etc.), a personal computer (e.g., any type of computing device with wireless communications capabilities such as a tablet computer, a laptop computer, etc.), a watch (e.g., a wireless smart watch), or any other type of hardware device that intentionally emits electromagnetic radiation for any purpose (e.g., communications, detection, etc.).

The electromagnetic interference emitted by an electromagnetic interference emitting device may be frequency dependent. That is, the electromagnetic interference emitted by the electromagnetic interference emitting device may be stronger in a first frequency band and weaker in a second frequency band. To provide electromagnetic interference suppression services, a data processing device in accordance with one or more embodiments of the invention may attenuate the electromagnetic interference emitted by an electromagnetic interference emitting device by at least a predetermined amount (e.g., 80 decibels) across at least one frequency band in which the electromagnetic interference emitting device emits electromagnetic interference. The at least one frequency band may be, for example, the frequency band in which the emitted electromagnetic interference has a largest magnitude.

In one or more embodiments of the invention, an electromagnetic interference emitting device emits electromagnetic interference having frequency content between 700 megahertz and 10 gigahertz. An electromagnetic interference emitting device may emit electromagnetic interference having different frequency content without departing from the invention.

The example system may also provide thermal management services devices disposed within the data processing devices (102). Thermal management services include managing the states of the devices disposed within the data processing devices (102) and/or the states of thermal management components to prevent the devices from entering thermal states that may damage the devices and/or other devices disposed within the data processing devices (102). By doing so, devices that may generate significant amounts of thermal energy may be disposed inside of the data processing devices (102) with a lower risk of damage to such devices occurring due to the thermal energy generated by the aforementioned devices.

To further discuss aspects of embodiments of the disclosed technology, each component of the system of FIG. 1.1 is discussed below.

In one or more embodiments of the invention, the frame (100) is a physical structure. The physical structure may be adapted to facilitate storage of the data processing devices (102) in a high-density computing environment. The high-density computing environment may be, for example, a data center or another type of location where multiple data processing devices are located. To facilitate storage of the data processing devices (102), the frame (100) may include any number of structural members (e.g., beams, brackets, bars, etc.) and any number of mechanical mounting points (e.g., holes, threaded portions, etc.) disposed on the structural members to facilitate storage of the data processing devices (102).

Different structural members may have different shapes, sizes, and/or other physical characteristics. The shapes, sizes, and/or other physical characteristics of the structural members may be adapted to enable the structural members to be mechanically connected (e.g., permanently or reversibly connected) to each other to form a predetermined structure. The predetermined structure may be, for example, a cage, box, or other type of structure that facilitates positioning and/or orienting the data processing devices (102).

When all, or a portion, of the structural members are mechanically connected to each other, the mechanical mounting points may be disposed at predetermined locations. The predetermined locations may correspond to similar predetermination locations on the data processing devices (102) where mechanical mounting elements, complementary to the mechanical mounting point, are disposed. By doing so, the frame (100) and the data processing devices (102) may be adapted to position the data processing devices (102) in locations and/or orientations compatible with a high-density computing environment, or another environment in which the data processing devices (102) may be located.

The mechanical mounting points may be any type of physical structure for attaching (permanently or reversibly) the data processing devices (102) to the frame (100). There may be any number of mechanical mounting points to facilitate the attachment of any number of data processing devices.

The frame (100) may be implemented using any number of suitable materials. For example, portions of the frame (100) may be implemented using metals (e.g., steel, aluminum, etc.). In another example, portions of the frame (100) may be implemented using polymers (e.g., polyamides, polycarbonates, polyester, polyethylene, polypropylene, polystyrene, polyurethanes, polyvinyl chloride, polyvinylidene chloride, acrylonitriline butadiene styrene, etc.). In a still further example, portions of the frame (100) may be implemented using rubber (e.g., latex, styrene-butadiene rubbers, etc.) The frame (100) may be implemented using any quantity and combination of suitable materials without departing from the invention.

In one or more embodiments of the invention, the data processing devices (102) are physical structures. For example, the data processing devices (102) may include a chassis, one or more computing devices disposed within the chassis, and/or other types of devices. For details regarding computing devices, refer to FIG. 7.

A chassis may be a mechanical device that is adapted to (i) facilitate attachment of the data processing device to the frame, (ii) house the one or more computing devices, (iii) house one or more electromagnetic interference emitting devices, and/or (iv) provide thermal management services to the computing devices and/or the electromagnetic interference emitting devices. For example, a chassis may be a frame mountable structure (e.g., a rectangular box) that includes internal space that may be used to house computing devices, electromagnetic interference emitting devices, and/or other types of devices. Thus, the chassis may be a frame mountable chassis.

The chassis may be implemented using any number of suitable materials. For example, portions of the chassis may be implemented using metals (e.g., steel, aluminum, etc.). In another example, portions of the chassis may be implemented using polymers (e.g., polyamides, polycarbonates, polyester, polyethylene, polypropylene, polystyrene, polyurethanes, polyvinyl chloride, polyvinylidene chloride, acrylonitriline butadiene styrene, etc.). In a still further example, portions of the chassis may be implemented using rubber (e.g., latex, styrene-butadiene rubbers, etc.) The chassis may be implemented using any quantity and combination of suitable materials without departing from the invention.

To facilitate attachment of the data processing device to the frame, the chassis may include any number of mechanical mounting elements. The mechanical mounting elements may be located at predetermined locations. The predetermined locations may correspond to similar predetermination locations on the frame (100) where mechanical mounting points, complementary to the mechanical mounting elements, are disposed.

For example, a mechanical mounting element may be a rail disposed on a side of a chassis of a data processing device. The location of the rail may correspond to a position on the frame (100) where a rail guide (i.e., a complementary mechanical mounting point) is disposed. The rail and the rail guide may facilitate attachment of a data processing device to the frame (100) which, in turn, positions and orients the data processing device relative to the frame (100).

To house the one or more computing devices, the chassis may include one or more internal volumes. The internal volumes may facilitate disposing of the one or more computing devices (and/or other devices) within a data processing device.

To house the one or more electromagnetic interference emitting devices, the chassis may include one or more internal volumes. The internal volumes may have a shape or other characteristic(s) that facilitates disposing of the one or more electromagnetic interference emitting devices within the data processing device. For example, an internal volume of the chassis may be a rectangular void capable of housing one or more electromagnetic interference emitting devices.

In one or more embodiments of the invention, the one or more internal volumes of the data processing devices are adapted to restrict propagation of electromagnetic interference emitted by the electromagnetic interference emitting devices (and/or other devices such as computing devices). For example, one or more portions of the chassis that bound the one or more internal volumes may be made of metal of a predetermined thickness to prevent and/or limit transmission of electromagnetic interference through the one or more portions of the chassis. By doing so, the electromagnetic interference generated by the electromagnetic interference emitting devices may be prevented (or at least severely attenuated when leaving an internal volume) from propagating from within the data processing devices (102) into the ambient environment surrounding the respective data processing devices (102). In other words, the internal volumes may electromagnetically isolate devices disposed within the chassis from devices disposed outside of the internal volumes (and/or between multiple internal volumes).

In another example, one or more portions of the chassis that bound the one or more internal volumes may be formed in a manner that filters electromagnetic radiation when electromagnetic radiation passes through the portions of the chassis. For example, a portion of the chassis that bounds the one or more internal volumes may be a waveguide filter such as an array of holes (e.g., sub-wavelength apertures corresponding to a particular frequency) in a metal sheet. By doing so, the electromagnetic interference generated by the electromagnetic interference emitting devices may be severely attenuated (e.g., attenuated by greater than 90 decibels (dB) or another suitable level, e.g., 30-45 dB, 45-60 dB, 60-75 dB, 75-90 dB, 90-120 dB, etc.) when propagating from within the data processing devices (102) into the ambient environment surrounding the respective data processing devices (102) (and/or other internal regions of the data processing devices (102)).

In a further example, one or more portions of the chassis that bound the one or more internal volumes may be made of an electromagnetic radiation attenuating material of a predetermined thickness to prevent and/or limit transmission of electromagnetic interference through the one or more portions of the chassis. The electromagnetic radiation attenuating material may be, for example, a composite of plastic or rubber that includes particulates of iron, carbonyl iron, or other electromagnetically lossy material. By doing so, the electromagnetic interference generated by the electromagnetic interference emitting devices may be severely attenuated (e.g., attenuated by greater than 90 decibels) when propagating from within the data processing devices (102) into the ambient environment surrounding the respective data processing devices (102).

To provide thermal management services to the computing devices and/or the electromagnetic interference emitting devices, the data processing devices (102) may facilitate the flow of gas proximate to the computing devices and/or electromagnetic interference emitting devices. By doing so, the thermal state (i.e., temperature) of the aforementioned devices may be regulated. The gas may be air or another type/combination of gasses obtained from any source.

For example, a data processing device may include one or more vents that enable gas from a first side of a data processing device to flow into the data processing device, through the data processing device, and out of a second side of the data processing device. The gas, flowing through the data processing device, may be at a different temperature than the computing devices and/or electromagnetic interference emitting devices. Consequently, thermal exchange between the flow of gas and the aforementioned devices may occur resulting in the temperature of the aforementioned devices changing. By doing so, heat generated by the aforementioned devices may be expelled from the devices thereby regulating the temperature of the aforementioned devices.

A system in accordance with embodiments of the invention may include any number of data processing devices. Different data processing devices (102) may have different configurations and/or uses within the system.

For example, some data processing devices may be adapted to house many electromagnetic interference emitting devices while other data processing devices may be primarily adapted to house computing devices. Additional data processing devices may be adapted to exclusively house data processing devices and no electromagnetic interference emitting devices. A system in accordance with embodiments of the invention may include any number and combination of data processing devices adapted for any number of different uses without departing from the invention.

By way of example, the system of FIG. 1.1 may include a first data processing device (104). The first data processing device (104) may be of a larger size than a second data processing device (106) and, consequently, may be capable of housing a larger number of electromagnetic interference emitting devices. The system of FIG. 1.1 may further include a third data processing device (108). In contrast to the first data processing device (104) and the second data processing device (106), the internal structure of the third data processing device (108) may be adapted to only housing computing devices rather than electromagnetic interference generating devices.

For additional details regarding data processing devices, refer to FIGS. 2.1-2.6.

As discussed above, data processing devices (102) may house electromagnetic interference emitting devices. When so housed, the electromagnetic interference emitting devices may operate thereby generating electromagnetic interference. At different points in time, it may be useful to add or remove electromagnetic interference emitting devices to or from the data processing devices (102). To facilitate such additions and/or removals, different portions of the data processing devices (102) may be adapted to reversibly provide access to the internal volumes of the data processing devices.

For example, the different portions of the data processing devices (102) may be adapted to rotate, translate, or otherwise move with respect to the remaining portions of the data processing devices (102). When the different portions of the data processing devices (102) are in a first predetermination position and/or orientation, they may electromagnetically seal one or more internal volumes of the data processing devices (102). That is, they may limit the extent to which electromagnetic radiation within the internal volumes is able to propagate to an ambient environment. However, when the different portions of the data processing devices (102) are rotated, translated, and/or otherwise moved to a second predetermined position and/or orientation to enable access to the internal volumes, the data processing devices (102) may not be electromagnetically sealed. Consequently, electromagnetic radiation within the internal volumes may be less limited by the data processing devices (102) to propagate into the ambient environment when access to the internal volumes is provided.

The data processing devices (102) may include hinges, slides, knobs, and/or other mechanical devices that facilitate movement of the different portions of the data processing devices (102) to reversibly reconfigure the data processing devices (102) between states where access (i.e., physical accessibility) to the internal volumes of the data processing devices (102) is provided and states where access to the internal volumes of the data processing devices (102) is not provided. FIGS. 1.2-1.3 show diagrams of the data processing devices (102) facilitating the addition, modification, and/or removal of electromagnetic interference emitting devices from the internal volumes of the data processing devices (102).

While the system of FIG. 1.1 has been illustrated as including a limited number of components, a system in accordance with embodiments of the invention may include any number of frames, data processing devices, and/or other components without departing from the invention. For example, any number of frames (and/or other types of physical devices for positioning/orienting devices) may be used in a high density computing environment to facilitate the placement and/or orientation of any number of data processing devices. Further, the frames may be used to position and/or orient other types of devices. The other types of devices may be, for examples, servers, storage nodes, compute nodes, communication devices (e.g., switches, routers, etc. for facilitating communications between any number of devices and/or devices external to a high density computing environment), or any other type of device that may be used in a computing environment (e.g., data center, computing nodes, communications center, etc.). Thus, the frame and data processing devices may be used in conjunction with any number and/or type of other device without departing from the invention.

FIG. 1.2 shows a diagram of the example system of FIG. 1.1 in a configuration (i.e., after a reconfiguration from the configuration illustrated in FIG. 1.1) where a front vent (110) of the first data processing device (104) has been opened. The front vent (110) may be opened by physically rotating and/or translating the front vent (110) to move the front vent (110) to a new physical location. By opening the front vent (110), physical access to internal volumes of the first data processing device (104) may be provided. Consequently, the internal configuration of the internal volumes of the first data processing device (104) may be modified. For example, electromagnetic interference emitting devices may be removed from and/or added to the internal volumes. Similarly, computing devices may be added to and/or removed from the internal volumes.

However, in the state illustrated in FIG. 1.2, the ability of the first data processing device (104) to limit propagation of and/or attenuate electromagnetic interference generated by electromagnetic interference emitting devices disposed within the first data processing device (104) may be compromised. In other words, the first data processing device (104) may be in an electromagnetic interference suppression compromised state that allows electromagnetic interference within internal volumes of the first data processing device (104) to propagate to the ambient environment around the first data processing device (104) without attenuation. In contrast, in the state illustrated in FIG. 1.1, the first data processing device (104) may be in an electromagnetic interference suppressed state (i.e., electromagnetic interference generated by the electromagnetic interference emitting devices may be contained within the internal volumes and/or attenuated by greater than 90 decibels when propagating out of the internal volumes).

In some embodiments of the invention, the first data processing device (104) automatically causes all, or a portion, of the electromagnetic interference emitting devices disposed within its internal volumes to suspend generation of electromagnetic interference when in the electromagnetic interference suppression compromised state illustrated in FIG. 1.2. By doing so, the first data processing device (104) may provide electromagnetic interference management services when the first data processing device (104) is in an electromagnetic interference suppression compromised state. All, or a portion, of the data processing devices of a system in accordance with embodiments of the invention may provide similar electromagnetic interference management services.

Similar to FIG. 1.2, FIG. 1.3 shows a diagram of the example system of FIG. 1.1 in a second configuration (i.e., after a reconfiguration from the configuration illustrated in FIG. 1.1) where a top door (112) of the second data processing device (106) has been opened after translating the second data processing device (106) with respect to the frame. The top door (112) may be all, or a portion, of the chassis that may be reversibly moved to enable access to internal volumes of the first data processing device (104).

Open the top door (112), for example, the second data processing device (106) may be mounted to the frame (100) via rails that enable the second data processing device (106) to translate with respect to the frame (100) via application of physical force. Once translated to a predetermined location, the top door (112) may be opened by application of physical force by a user.

By opening the top door (112), physical access to the internal volumes of the second data processing device (106) may be provided. Consequently, the internal configuration of the internal volumes of the second data processing device (106) may be modified. For example, electromagnetic interference emitting devices may be removed from and/or added to the internal volumes of the second data processing device (106). Similarly, computing devices may be added to and/or removed from the internal volumes of the second data processing device (106).

However, in the state illustrated in FIG. 1.3, the ability of the second data processing device (106) to limit propagation of and/or attenuate electromagnetic interference generated by electromagnetic interference emitting devices disposed within the second data processing device (106) may be compromised. In other words, the second data processing device (106) may be in an electromagnetic interference suppression compromised state that allows electromagnetic interference within internal volumes of the second data processing device (106) to propagate to the ambient environment around the second data processing device (106) without attenuation. In contrast, in the state illustrated in FIG. 1.1, the first data processing device (104) may be in an electromagnetic interference suppressed state (i.e., electromagnetic interference generated by the electromagnetic interference emitting devices may be contained within the internal volumes and/or attenuated by greater than 90 decibels when propagating out of the internal volumes).

In some embodiments of the invention, the second data processing device (106) automatically causes all, or a portion, of the electromagnetic interference emitting devices disposed within its internal volumes to suspend generation of electromagnetic interference when in the electromagnetic interference suppression compromised state illustrated in FIG. 1.3. By doing so, the second data processing device (106) may provide electromagnetic interference management services when the second data processing device (106) is in an electromagnetic interference suppression compromised state. All, or a portion, of the data processing devices of a system in accordance with embodiments of the invention may provide similar electromagnetic interference management services (e.g., automatically terminating and/or resuming the electromagnetic interference generation depending on the electromagnetic interference suppression state of the data processing device).

Thus, as illustrated in FIGS. 1.1-1.3, a system in accordance with embodiments of the invention may provide electromagnetic interference management services to devices disposed within the data processing devices when the data processing devices are in an electromagnetic interference suppression compromised state or an electromagnetic interference suppressed state.

As discussed above, a system in accordance with one or more embodiments of the invention may include one or more data processing devices. FIGS. 2.1-2.6 show diagrams of data processing devices in accordance with embodiments of the invention.

FIG. 2.1 shows a diagram of the second data processing device (106) in accordance with one or more embodiments of the invention. As discussed above, the second data processing device (106) may provide electromagnetic interference management services for electromagnetic interference emitting devices (and/or other devices) disposed within the second data processing device (106). In addition to electromagnetic interference management services, the second data processing device (106) may provide thermal management services and/or power management services. The aforementioned services may be provided to electromagnetic interference emitting devices, computing devices, and/or other types of devices disposed within the second data processing device (106).

To do so, the second data processing device (106) may include a chassis (198). The chassis (198) may be a structure that is mountable to a frame. By being mountable to a frame, the chassis (198) may be usable in a high density environment. For example, the chassis (198) may be a rail mount chassis. The chassis (198) may be mountable via other methods (e.g., using mechanical features other than rails such as bolts, screws, pins, etc.).

The chassis (198) may include a front vent (200), a rear vent (204), a support module (208), and a payload module (210). Each of these components of the second data processing device (106) is discussed below.

The front vent (200) may be a physical device for (i) enabling gas flow through the second data processing device (106) and (ii) limiting the propagation of electromagnetic interference from an internal volume of the second data processing device (106) and/or attenuating electromagnetic interference that propagates from an internal volume of the second data processing device (106) to an ambient environment around the second data processing device (106) via the front vent (200). For additional details regarding the internal volume, refer to FIGS. 2.2-2.6.

In one or more embodiments of the invention, the front vent (200) is a rectangular structure formed with holes (202) that enable gasses to flow between the ambient environment surrounding the second data processing device (106) and an internal volume of the second data processing device (106). By doing so, the second data processing device (106) may provide thermal management services to components disposed within the second data processing device (106) by controlling the flow of gasses from the ambient environment through the second data processing device (106).

For example, the second data processing device (106) may be used in a high-density computing environment in which a source of cool gas is supplied to a first side of the second data processing device (106). In such an environment, the second data processing device (106) may cause the cool gas to flow into the second data processing device (106) via the front vent (200) and exhaust gas out a second side of the second data processing device (106) (e.g., out of the support module (208)). Alternatively, the second data processing device (106) may cause a reverse gas flow, with respect to the gas flow discussed above, if the source of cool gas is supplied proximate to the support module (208) rather than proximate to the front vent (200).

The structure of the front vent (200) may also be adapted to limit propagation of electromagnetic radiation through the front vent (200) and/or attenuate electromagnetic radiation that propagates through the front vent (200). For example, the size, position, number, shape, and/or other characteristics of the holes (202) through the front vent may be adapted to (i) limit propagation of electromagnetic radiation and/or (ii) attenuate propagating electromagnetic radiation. In another example, the thickness and material choice of the front vent (200) may be adapted to (i) limit propagation of electromagnetic radiation and/or (ii) attenuate propagating electromagnetic radiation. By being so adapted, the front vent (200) may attenuate electromagnetic radiation that propagates through the front vent (200) by at least 90 decibels or another desirable quantity (e.g., 30 decibels, 45 decibels, 60 decibels, 75 decibels, 120 decibels, etc.).

To facilitate the flow of air between the ambient environment and the internal volume of the second data processing device (106), the size, position, number, shape, and/or other characteristics of the holes (202) may be selected to meet gas flow requirements for thermal management purposes while providing electromagnetic interference suppression characteristics.

In one or more embodiments of the invention, the rear vent (204) is similar to the front vent (200). For example, the rear vent (204) may provide similar attenuation and/or restriction of propagation of electromagnetic radiation while enabling gasses to flow between internal volumes of the second data processing device. The rear vent (204) may have a similar structure to that of the front vent (200). However, the structure (e.g., different hole pattern, thickness, hole type, etc.) and/or electromagnetic (e.g., attenuation and/or reflection of electromagnetic radiation) and/or hydrodynamic (e.g., impedance to fluid flow) characteristics of the rear vent (204) may be different from the front vent (200) without departing from the invention.

The payload module (210) may be a physical device for (i) housing electromagnetic interference devices (and/or other types of devices), (ii) limiting propagation of electromagnetic interference from internal volumes of the second data processing device (106) to the ambient environment surrounding the second data processing device (106), and (iii) thermally regulating devices disposed within the payload module (210). For additional details regarding the payload module (210), refer to FIGS. 2.2-2.6.

The support module (208) may be a physical device for housing devices that provide services to devices disposed within the payload module (210). For example, the support module (208) may house thermal management systems for managing the thermal states of devices, power systems for powering devices, communication systems for facilitating communications between devices, and/or computing devices for managing the operation of the second data processing device. The aforementioned devices may provide corresponding services to devices disposed in other portions of the second data processing device (106) and/or devices located in other locations (i.e., external to the second data processing device (106).

In one or more embodiments of the invention, the support module (208) does not provide electromagnetic interference management services to devices disposed within the support module (208), in contrast to the payload module (210). For example, the support module (208) may not intentionally isolate electromagnetic interference generated by devices disposed within the support module (208) from the ambient environment surrounding the second data processing device (106). Intentionally isolating electromagnetic interference means that the structure of a physical structure is adapted to provide such isolation. While many types of physical structures may provide some degree of electromagnetic interference isolation as an inherent consequence of their existence, the electromagnetic interference isolation is not intended. Rather, the physical structures may exist for their other properties such as mechanical strength while providing some degree (albeit low) of electromagnetic interference isolation. Thus, while the support module (208) may to some degree electromagnetically separate devices disposed within the support module (208) from the ambient environment, the support module (208) may not provide electromagnetic interference management services. Providing electromagnetic interference management services may refer to providing at least 20 decibels of attenuation (e.g., isolating a volume electromagnetically from other volumes by 20 dB).

In one or more embodiments of the invention, providing electromagnetic interference management services means reducing the strength of electromagnetic radiation by at least 20 decibels when the electromagnetic radiation propagates from an internal volume of a data processing device to an ambient environment outside of the data processing device (or other portions of the data processing device).

To further clarify aspects of embodiments of the invention, a cross section diagram of the second data processing device (106) in accordance with one or more embodiments of the invention is shown in FIG. 2.2. In FIG. 2.2, the cross section is taken along the X-Y plane illustrated in FIG. 2.1.

As seen from FIG. 2.2, the payload module (210) may include an internal volume (214). The internal volume (214) may be used to house devices such as electromagnetic interference emitting devices, supports for such devices, and/or other devices that may provide services to the electromagnetic interference emitting devices and/or other devices.

The internal volume (214) may be bounded, on four sides, by portions of the payload module (210). For example, the internal volume (214) may be bounded by a top door (212), a bottom (218), a first side (216), and a second side (not shown). These four components of the payload module (210) may define a rectangular shape of the internal volume (214).

The internal volume (214) may be further bounded, on a fifth and sixth size, by the front vent (200) and the rear vent (204). The front vent (200) and the rear vent (204) may be on opposite sides of the internal volume (214). By doing so, the front vent (200) and the rear vent (204) may define a gas flow path through the payload module (210). For example, gasses may be able to flow from between the two vents through the internal volume (214). For additional discussion of gas flow paths, refer to FIG. 2.5.

As discussed above, the second data processing device may control gas flows disposed within the second data processing device to provide thermal management services. To do so, the second data processing device may include a thermal management system (220). The thermal management system may include (i) gas flow control devices (not shown), (ii) temperature sensors (not shown), and/or (iii) a controller (e.g., a computing device(s)) (not shown).

The controller may operate the gas flow control devices based on temperature information (e.g., thermal states) obtained from the temperature sensors and/or temperature information obtained from other devices (e.g., from electromagnetic interference emitting devices). For example, the controller may increase the flow rate of a gas flow disposed within the second data processing devices to manage the temperature of one or more devices within a predetermined range.

The flow control devices may be, for example, fans or other types of active devices for controlling the flow of gasses. The thermal management system (220) may include any number of flow control devices without departing from the invention.

The controller may also selectively control the amount of power consumed by devices disposed within the internal volume. Consumption of power by such devices may directly contribute to their thermal state and the thermal state of other devices.

For example, consumption of power may generate heat. Thus, when a device consumes power its thermal state may change.

In another example, when devices consume power the devices may contribute heat to the internal volume (214). Such contributions of heat may be through conduction, convection, and/or radiation. Depending on the arrangement of devices within the internal volume (214), contributions of heat to the internal volume (214) may modify the thermal state of other devices located in the internal volume (214). Consequently, consumption of power by a first device may result in the modification of the thermal state of a second device. For additional details regarding contributions of heat that may modify the thermal states of other devices, refer to FIGS. 2.5-2.6.

When providing the functionality of the thermal management system (220), the thermal management system (220) may invoke the functionality the power system (222). As will be discussed in greater detail below, the power system (222) may provide power to devices disposed within the internal volume (214). To selectively control which of the devices disposed within the internal volume (214) are consuming power, the thermal management system (220) may send instructions to the power system (222) with respect to which devices may be provided power and/or any quantity of power to be provided to the aforementioned devices.

In one or more embodiments of the invention, the controller is a computing device. The computing device may be, for example, mobile phones, tablet computers, laptop computers, desktop computers, servers, distributed computing systems, cloud resources, embedded computers, on-chip computers, digital signal processors, etc. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functionality of the thermal management system (220) described in this application and all, or a portion thereof, of the methods illustrated in FIGS. 4.1-5. The controller may be other types of computing devices without departing from the invention. For additional details regarding computing devices, see e.g., FIG. 7.

In one or more embodiments of the invention, the controller is a distributed computing device. As used herein, a distributed computing device refers to functionality provided by a logical device that utilizes the computing resources of one or more separate and/or distinct computing devices. For example, in one or more embodiments of the invention, the controller may be distributed devices that include components distributed across any number of separate and/or distinct computing devices. In such a scenario, the functionality of the controller may be performed by multiple different computing devices without departing from the invention. For additional details regarding the thermal management system (220), refer to FIG. 3.

The second data processing device may also include a power system (222). The power system may provide power to any number and/or types of devices disposed within the second data processing device. For example, the power system (222) may provide power to electromagnetic interference emitting devices disposed within the payload module (210), the thermal management system (220), a communication system (224), and/or computing devices (226).

To do so, the power system (222) may include, for example, one or more power supplies, regulators, controllers, and/or other types of components for providing power. The aforementioned components may identify components to which power is to be supplied, identify a quantity of power to supply to each of the components, and/or provide the power to each of the respective components.

The power system (222) may provide power using an interconnect (230). The interconnect (230) may be one or more connections between the power system (222) and devices disposed within the internal volume (214). The connections may be operable to facilitate providing a power to the devices disposed within the internal volume (214) from the power system (222). For example, the interconnect (230) may be a power distribution bus. The interconnect (230) may be other types of physical devices for power distribution.

In one or more embodiments of the invention, the power system (222) provides power in accordance with instructions from the thermal management system (220). As discussed above, consumption of power by devices disposed within the internal volume (214) may impact the thermal state of one or more devices disposed within the internal volume (214). To manage the thermal states of such devices disposed within the internal volume (214), the thermal management system (220) may limit power supplied to the aforementioned devices while ensuring that minimum requirements for their power consumption requirements are met.

The second data processing device may further include a communication system (224). The communication system may provide communication services to devices disposed outside of the second data processing device. Due to the electromagnetic interference isolation provided by the second data processing device, components disposed within the payload module (210) may be unable to wirelessly communicate with devices outside of the second data processing device.

To provide communication services, the communication system (224) may include, for example, one or more transceivers, communication processors, and/or other types of components for providing communication services. The aforementioned components may provide the communication services. The communication services may include, for example, exchanging network data units with electromagnetic interference emitting devices disposed in the payload module, a computing device (226) disposed in the support module (208), and/or other devices disposed outside of the second data processing device. By doing so, the aforementioned devices may communicate with one another via information included in the exchanged network data units. A network data unit may be a communication supported by a communication protocol that enables information to be transmitted. A network data unit may be, for example, a packet in the event that an internet protocol is utilized. As will be discussed in greater detail below, the communication system (224) may provide the communication services using an interconnect (230).

The computing device (226) may manage the operation of the components of the second data processing device. For example, the computing device (226) may manage the thermal management system (220), the power system (222), the communication system (224), and/or other components (such as electromagnetic interference emitting devices) disposed within the second data processing device. To manage the other devices, the computing device (226) may use the communication services provided by the communication system (224) as well as the interconnect (230).

As noted above, the interconnect (230) may be a physical device for providing operable connections between devices disposed within the second data processing device. The interconnect (230) may support any communication protocol to provide such operable connections as well as power distribution from the power system (222) to devices disposed within the internal volume (214).

For example, the interconnect (230) may include a set of wires that physically interconnect devices disposed within the second data processing device. The set of wires may be utilized by the devices to communicate with each other.

In one or more embodiments of the invention, the interconnect (230) facilitates communications between electromagnetic interference emitting devices disposed within the payload module (210) while the electromagnetic interference emitting devices are isolated. By doing so, the electromagnetic interference emitting devices may communicate with devices outside of the payload module (210) without negatively impacting the operation of other devices due to electromagnetic interference generated by the electromagnetic interference emitting devices.

To do so, the second data processing device may include a back-plane (232). The back-plane may electromagnetically isolate the interconnect (230) from the internal volume of the payload module (210). For example, the back-plane (232) may be a metal sheet of sufficient thickness to prevent electromagnetic interference from penetrating through the back-plane (232).

The back-plane (232) may include any number of feedthroughs (234). The feedthroughs (234) may be physical devices that enable the interconnect (230) to physically connect to any number of devices disposed within the payload module (210).

To further clarify the use of feedthroughs (234) in connection with devices disposed within the payload module (210), FIG. 2.3 shows a second cross section diagram of the second data processing devices in accordance with one or more embodiments of the invention in a state in which electromagnetic interference emitting devices (240) have been disposed in the payload module (210). The cross section illustrated in FIG. 2.3 is taken along the X-Y plane illustrated in FIG. 2.1.

As seen from FIG. 2.3, each of the electromagnetic interference emitting devices (240) may be disposed proximate to one of the feedthroughs (234). The feedthroughs may enable each of the electromagnetic interference emitting devices (240) to be physically connected to the interconnect. By doing so, the electromagnetic interference emitting devices (240) may utilize the interconnect to communicate with other devices (e.g., via the communication system). Consequently, the electromagnetic interference emitting devices (240) may be operably connected to devices, external to the payload module, while being electromagnetically isolated from the devices for radiative electromagnetic interference purposes.

As noted above, the feedthroughs (234) may enable electromagnetic interference emitting devices (240) to be operably connected to other devices while still being electromagnetically isolated. By doing so, power may be selectively provided to the electromagnetic interference emitting devices (240) (and/or other types of devices disposed within the internal volume.

In FIG. 2.3, only a single row of electromagnetic interference emitting devices (240) are illustrated. To further clarify aspects of embodiments of the invention, a third cross section diagram in accordance with one or more embodiments of the invention is illustrated in FIG. 2.4. The cross section diagram of FIG. 2.4 is taken along the X-Y plane shown in FIG. 2.1.

As seen from FIG. 2.4, a data processing device in accordance with embodiments of the invention may include multiple rows (242) of electromagnetic interference emitting devices (240). A row of the devices (244) may include any number of electromagnetic interference emitting devices. For example, in FIG. 2.4, the row of the devices (244) is illustrated as including seven electromagnetic interference emitting devices. However, the data processing device in accordance with embodiments of the invention may include any number of rows of devices. Each of the rows may include any number of devices. Some or all of the devices may be electromagnetic interference emitting devices. Different rows may include different numbers of devices. Different devices in each of the rows may be different types of devices.

For example, a row may include three electromagnetic interference emitting devices (240), two tablet computing devices, and a communications device such as a router. In another example, a row may include five tablet computing devices and no other types of devices. In a still further example, a row may include (like that illustrated in FIG. 2.4) seven electromagnetic interference emitting devices (240). Thus, a data processing device in accordance with embodiments of the invention may include any number of rows of the devices and in each of the rows may include similar and/or different devices.

As seen from FIG. 2.4, devices disposed in a row may be along the direction of gas flow. With respect to FIG. 2.4, gases may traverse from left to right on the page or the reverse. Due to the direction of gas traversal, some of the devices in a row of devices that is aligned with the direction of gas traversal may be thermally shadowed by other devices in the row. That is, devices upstream of the gas flow direction may emit thermal energy that impacts the thermal state of devices downstream (e.g., downstream devices) from the upstream devices. Consequently, the thermal state of devices disposed within the internal volume of the data processing device may depend upon (i) the amount of thermal energy being generated by the device, (ii) the amount of thermal energy being generated by upstream devices, and (iii) characteristics of gas flow proximate to the device including, for example, the thermal state of the gas flow, a flow rate of the gas flow, a type of the gas of the gas flow, etc.

To further clarify how gas flows may impact the thermal states of devices disposed within the internal volume, figures that depict such gas flows are illustrated in FIGS. 2.5-2.6.

FIG. 2.5 shows a fourth cross section diagram of the second data processing device in accordance with one or more embodiments of the invention. The cross-section diagram illustrated in FIG. 2.5 may be similar to that illustrated in FIG. 2.3. For the sake of brevity, element labels for a portion of the components of the second data processing device are omitted from FIG. 2.5 and a depiction of a gas flow (250) is added. In FIG. 2.5, the gas flow (250) is depicted as arrows having dashed tails.

As seen from FIG. 2.5, the gas flow may traverse from outside of the second data processing device, into the internal volume through the front vent (200), out of the internal volume and into the support module (208) via the rear vent (204), and out of the support module (208) into an ambient environment. The direction of the gas flow (250) may be reversed without departing from the invention.

Due to the direction of the gas flow (250) illustrated in FIG. 2.5, thermal energy generated by devices closer to the front vent (200) may impact the thermal state of devices further away from the front vent (200). For example, if the first device closest to the front vent (200) generates thermal energy in the form of heat, the heat may propagate into the second device next closest to the front vent (200) due to convection based thermal transport. In such a scenario, the thermal state of the second closest device to the front vent (200) may depend on the amount of thermal energy generated by the first device closest to the front vent (200).

Returning to FIG. 2.6, FIG. 2.6 shows a fifth cross section diagram of the second data processing device in accordance with one or more embodiments of the invention. The fourth cross section diagram illustrated in FIG. 2.6 may be similar to that illustrated in FIG. 2.4. For the sake of brevity, element labels for a portion of the components of the second data processing device are omitted from FIG. 2.6 and a depiction of the gas flow (250) is added. In FIG. 2.6, the gas flow (250) is depicted as arrows having dashed tails.

As seen from FIG. 2.5, different portions of the gas flow (250) may traverse approximately two different rows of electromagnetic interference emitting devices (240). Consequently, thermal energy generated by upstream electromagnetic interference emitting devices (240) may primarily impact the thermal state of devices that are in the same row. For example, it may be unlikely that an upstream device in the top row of electromagnetic interference emitting devices impacts a thermal state of downstream devices in the bottom row of electromagnetic interference emitting devices.

Thus, as illustrated in FIGS. 2.5-2.6, a data processing device in accordance with embodiments of the invention may include devices disposed in internal volumes that are arranged in rows. Due to the aforementioned arrangement, upstream devices may impact the thermal state of downstream devices. One or more embodiments of the invention may provide a method for managing the thermal state of devices by taking into account such thermal state relationships.

To further clarify the operation of a thermal management system in accordance with one or more embodiments of the invention, a diagram of an example thermal management system (300) in accordance with one or more embodiments of the invention is shown in FIG. 3. As discussed above, thermal management systems of data processing devices may manage the thermal states of devices by (i) modulating gas flows proximate to the devices and (ii) modulating power consumption by devices disposed within a row. By doing so, embodiments of the invention may facilitate power consumption by multiple devices in a row that, if left unchecked, may result in thermal states of such devices that impact the operation of the devices.

To provide the above noted functionality, the example thermal management system (300) may include a state manager (302), gas flow control device(s) (304), and a persistent storage (310). Each of the components of the example thermal management system (300) is discussed below.

The state manager (302) may manage the state(s) of the gas flow control device(s) (304) and the power states of devices disposed within an internal volume of a data processing device. To manage the state(s) of the gas flow control device(s) (304), the state manager (302) monitors the thermal states of devices and may increase or decrease the amount of gas flow generated by the gas flow control device(s) (304) based on the monitoring of the thermal states of the devices. By doing so, the state manager (302) may change the rate of thermal energy removed from the devices by the gas flow through a data processing device which, in turn, may regulate the thermal states of the devices.

The state manager (302) may manage the power states of the devices to further regulate the thermal states of the aforementioned devices. For example, it may not be possible to regulate the thermal state of devices disposed in a row using only control of the flow of gas within a data processing device. To further regulate the thermal state of the aforementioned devices, the state manager (302) may restrict consumption of power by one or more devices disposed in a row. Restricting the consumption of power by the one or more devices may, as discussed with respect to FIGS. 2.5-2.6, further assist in the regulation of the thermal states of downstream devices in a row of devices.

When regulating the power states of the devices, the state manager (302) may invoke the functionality of a power system which supplies power to the devices. The state manager (302) may invoke such power by sending requests to the power system to modify the amount of power being provided to the devices. Alternatively, or in addition, the state manager (302) may send such requests (and/or additional requests) to the devices which, in response to the requests, may alter their power consumption in accordance with the requests.

In one or more embodiments of the invention, the state manager (302) is implemented as a hardware device including circuitry. The state manager (302) may be, for example, a digital signal processor, a field programmable gate array, or an application specific integrated circuit. The state manager (302) may be other types of hardware devices without departing from the invention.

In one or more embodiments of the invention, the state manager (302) is implemented as computing code stored on a persistent storage that when executed by a processor performs the functionality of the state manager (302). The processor may be a hardware processor including circuitry such as, for example, a central processing unit or a microcontroller. The processor may be other types of hardware devices for processing digital information without departing from the invention.

To provide the above noted functionality of the state manager (302), the state manager may perform all, or a portion, of the methods illustrated in FIGS. 4.1-5.

The gas flow control device(s) (304) may be physical devices that control the flow of gas within a data processing device. The gas flow control device(s) (304) may be, for example, fans, valves, actuators, or any other type of component that may impact a flow rate of a gas through the data processing device.

In one or more embodiments of the invention, the persistent storage (310) is a storage device that stores data structures. The persistent storage (310) may be a physical or logical device. For example, the persistent storage (310) may include solid state drives, tape drives, and other components to provide data storage functionality. Alternatively, the persistent storage (310) may be a logical device that utilizes the physical computing resources of other components to provide data storage functionality.

The persistent storage (310) may store a state repository (312). The state repository (312) may be a data structure that includes information regarding the state of various components of the system of FIG. 1.1. For example, the state repository (312) may include information regarding (i) the thermal states of devices disposed within a data processing device, (ii) the power states of the devices, (iii) a maximum number of devices in a row that are allowed to simultaneously consume power and/or a power consumption level for each of the devices, and/or (iv) the state of gas flow control devices that may control a flow rate of gas through the data processing device. The state repository (312) may be maintained and/or utilized by the state manager (302) when the state manager (302) manages the various states.

In one or more embodiments of the invention, the state repository (312) is a list including the above noted information regarding the various states of devices of the system of FIG. 1.1. The state repository (312) may be implemented using different structures without departing from the invention. Further, the state repository (312) may be stored in different locations, sub-divided into any number of data structures, include different/less/additional information than discussed above, and/or spanned across any number of devices without departing from the invention.

While the example thermal management system (300) has been illustrated as including a limited number of specific components, a thermal management system in accordance with one or more embodiments of the invention may include additional, fewer, and/or different components without departing from the invention.

To further clarify aspects of embodiments of the invention, methods that may be performed by and/or separately from the system of FIG. 1.1 are illustrated in FIGS. 4.1-5. The aforementioned methods may be performed when managing the thermal and/or power states of devices.

FIG. 4.1 shows a flowchart of a method in accordance with one or more embodiments of the invention. The method depicted in FIG. 4.1 may be used to manage a thermal state of a device in accordance with one or more embodiments of the invention. The method shown in FIG. 4.1 may be performed completely, or in part, by, for example, data processing devices (e.g., 102, FIG. 1.1). Other components of the system illustrated in FIG. 1.1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, a portion of the state repository associated with a row of devices is updated based on the states of the devices.

In one or more embodiments of the invention, the remote devices are disposed in an internal volume of the data processing device.

In one or more embodiments of the invention, the portion of the state repository is updated by modifying the portion of the state repository to match the states of the devices. States of the devices may be obtained by, for example, sending a request to the devices for the states of the devices. The states of the devices may be the thermal states of the devices. The thermal state of a device may be a temperature of the device.

In one or more embodiments of the invention, all, or a portion, of the devices are electromagnetic interference emitting devices. All, or a portion, of the electromagnetic interference emitting devices may include a battery. When performing one or more functionalities of the electromagnetic interference emitting devices, electromagnetic interference emitting devices may be powered using the battery. For example, to test the functionality of the electromagnetic interference emitting devices, the battery may be used to power the electromagnetic interference emitting devices during the testing to simulate likely actual-use conditions.

Updating the portion of the state repository may provide an updated state repository. For example, the updated state repository may include up to date information regarding the actual states which are reflected in the state repository.

In one or more embodiments of the invention, the portion of the state repository is updated via the method illustrated in FIG. 4.2. The portion of the state repository may be updated via other methods without departing from the invention.

In step 402, it is determined whether the portion indicates a thermal issue.

The portion of the state repository may indicate a thermal issue when the thermal state of one or more of the devices and the role of devices as a thermal state exceeds the first criteria. The first criteria may be, for example, a predetermined temperature. The predetermined temperature may correspond to a temperature at which one or more components of the device may be impacted by exposure to the temperature. For example, the temperature may correspond to a temperature at which a battery of the device is subject to damage, degradation, etc.

To make the determination, the thermal states for the row of devices specified in the updated state repository may be compared to the first criteria. If any of the thermal states for the row of devices specified in the updated state repository meets the first criteria, it may be determined that the portion indicates the thermal issue.

If it is determined that the portion indicates a thermal issue exists, the method may proceed to step 404. If it is determined that the portion does not indicate a thermal issue exists, the method may proceed to step 400. Thus, via the loopback to step 400, the method may provide for continuous monitoring of the states of devices to determine whether the thermal issue exists. If a thermal issue does exist, the method may provide steps for addressing the thermal issue via the remaining steps starting in step 404.

In step 404, it is determined whether the thermal issue may be addressed using a gas flow. As discussed above, a gas flow throughout the data processing device may exist for the purposes of managing thermal energy of the devices. In other words, the gas flow may extract thermal energy from the devices to manage the thermal states of the devices.

In one or more embodiments of the invention, the determination is made based on the severity of the thermal issue. For example, if a thermal state of the device associated with thermal issue exceeds a second predetermined criteria, it may be determined that the thermal issue may not be addressed using the gas flow. For example, if a temperature of the device exceeds a predetermined temperature specified by the predetermined criteria, it may be determined that gas flow may not address the thermal issue.

The gas flow may not be able to address the thermal issue due to limits on the flow rate of the gas flow. As discussed above, gas flow control components may be able to modulate the rate of the gas flow. However, there may be limits on the range in which the rate of the gas flow may be modulated. Consequently, if the thermal state of the device meets the second predetermined criteria, it may not be possible to address the thermal issue because it may not be possible to generate a sufficiently high rate of flow of the gas flow to address the thermal issue. In other words, the gas flow may only be able to be modulated up to a predetermined maximum flow rate which, in turn, may only be capable of addressing rates of thermal energy generation corresponding to the maximum flow rate.

If it is determined that the thermal issue can be addressed using the gas flow, the method may proceed to step 406. If it is determined that the thermal issue cannot be addressed using the gas flow, the method may proceed to step 408.

In step 406, the state of the gas flow control component is modified to address a thermal issue.

In one or more embodiments of the invention, the state of the gas flow control component is modified to increase the rate of the gas flow controlled by the gas flow component. For example, if the gas flow control component is a fan, the rotational rate of the fan may be increased to increase the gas flow rate. By doing so, the gas flow within the data processing device may extract a larger amount of thermal energy from the device associated with the thermal issue. Consequently, the thermal issue may be resolved by extracting the larger amount of thermal energy.

The method may end following step 406.

Returning to step 404, the method may proceed to step 408 following step 404 if the thermal issue may not be addressed using the gas flow.

In step 408, a power state of at least one of the devices in the row is modified to address the thermal issue.

In one or more embodiments of the invention, the at least one of the devices is the device associated with thermal issue. The power state of the at least one of the devices may be modified by decreasing the power consumption rate of the at least one of the devices. By decreasing the power consumption rate of the at least one devices, the thermal state of the at least one devices may be modified by reducing the rate of thermal generation by the at least one devices due to power consumption.

In one or more embodiments of the invention, the at least one of the devices is a second device in the row of the devices that is not the device associated with the thermal issue. For example, the second device may be an upstream device from the device that is having the thermal issue in the row. As discussed above, power consumption by the upstream device impacts the thermal state of the device having the thermal issue in the row. The power state of the second device may be modified by decreasing the power consumption rate of the second device. By decreasing the power consumption rate of the second device, the thermal state device associated with the thermal issue may be modified by reducing the rate of thermal generation by the second device which impacts the thermal state of the device associated with the thermal issue.

While the at least one of the devices has been described as the second device, the power states of multiple upstream devices may be modified to address the thermal issue without departing from the invention. For example, the power consumption rate of multiple upstream devices may be reduced to address the thermal issue associated with the device in the row. In other words, when a device in a row has a thermal issue that cannot be addressed using a gas flow, the power consumption rates of multiple upstream devices in the row may be modified to address the thermal issue by reducing the amount of thermal energy generated by the upstream devices.

In one or more embodiments of the invention, the power state of the at least one of the devices in the row is modified to address the thermal issue via the method illustrated in FIG. 4.3. The power state of the at least one of the devices in the row may be modified to address the thermal issue via other methods without departing from the invention.

The method may end following step 408.

As discussed with respect to FIG. 4.1, an updated state repository may be obtained when performing the method of FIG. 4.1. FIG. 4.2 shows a flowchart of a method of updating a state repository in accordance with one or more embodiments of the invention. The method depicted in FIG. 4.2 may be used to update a portion of a state repository in accordance with one or more embodiments of the invention. The method shown in FIG. 4.2 may be performed completely, or in part, by, for example, data processing devices (e.g., 102, FIG. 1.1). Other components of the system illustrated in FIG. 1.1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 410, it is determined whether the temperature of the device in a row is greater than a predetermined temperature.

In one or more embodiments of the invention, the predetermined temperature is a temperature at which continued exposure to the temperature by the device is not recommended. For example, exposure to the temperature may cause damage and/or otherwise degrade the device.

The determination may be made by comparing the temperature of the device in the row to the predetermined temperature.

If the temperature of the device in the row is greater than the predetermined temperature, the method may proceed to step 414. If the temperature of the device in the row is less than the predetermined temperature, the method may proceed to step 412.

In step 412, the maximum number of allowable charging devices for the row of devices is increased.

The maximum number of allowable charging devices for the row of devices may be increased by modifying a portion of the state repository. A portion of the state repository may be a data structure for specifying the maximum number of allowable charging devices for the row of devices. As discussed with respect to FIGS. 2.5-2.6, devices within a row may impact the thermal states of the other devices.

For example, a device that is charging in a row may generate a sufficient quantity of thermal energy to cause a downstream device from the device that is charging to increase in temperature. Thus, the device that is charging may change the thermal state of the downstream device. The maximum number of allowable charging devices for the row may be a limit on the number of devices in the row that may be charging simultaneously. The aforementioned limit may be used to manage the thermal states of the devices in the row.

For example, as the average temperature of the devices in the row increases, the maximum allowable number of devices that may be charging simultaneously may decrease because of the impact thermal energy generated due to charging may have on the thermal states of the devices in the row. In another example, as the average temperature of the devices in the row decreases, the maximum allowable number of devices that may be charging simultaneously may increase because of the reduced impact thermal energy generated due to the charging may have on thermal states of the devices in the row. In other words, devices that are already at an elevated temperature in a row may be more susceptible to the impact of thermal energy generated by other devices in the row.

The method may end following step 412.

Returning to step 410, the method may proceed to step 414 following step 410 if the temperature of the device and the row is greater than the predetermined temperature.

In step 414, the maximum number of allowable charging devices for the row of devices is decreased. The maximum number of allowable charging devices for the row of devices may be decreased by modifying a portion of the state repository. The portion of the state repository may be a data structure for specifying the maximum number of allowable charging devices for the row of devices, as discussed with respect to step 412. The portion of the state repository may be modified by documenting an existing indication of the maximum number of allowable charging devices for the row devices included in the portion of the state repository.

The method may end following step 414.

As discussed with respect to FIG. 4.1, the power state of at least one device in a row of devices may be modified when performing the method of FIG. 4.1. FIG. 4.3 shows a flowchart of a method of modifying the power state of devices in a row in accordance with one or more embodiments of the invention. The method depicted in FIG. 4.3 may be used to update a portion of a state repository in accordance with one or more embodiments of the invention. The method shown in FIG. 4.3 may be performed completely, or in part, by, for example, data processing devices (e.g., 102, FIG. 1.1). Other components of the system illustrated in FIG. 1.1 may perform all, or a portion, of the method of FIG. 4.3 without departing from the invention.

While FIG. 4.3 is illustrated as a series of steps, any of the steps may be omitted, performed in a different order, additional steps may be included, and/or any or all of the steps may be performed in a parallel and/or partially overlapping manner without departing from the invention.

In step 420, it is determined whether the thermal issue is an overtemperature issue.

In one or more embodiments of the invention, the determination is made by comparing the temperature of the device associated with the thermal issue to a maximum allowable temperature for the device. The maximum allowable temperature of the device may be a temperature at which exposure to the temperature may damage or otherwise degrade the device.

If it is determined that the thermal issue is an overtemperature issue, the method may proceed to step 428. If it is determined that the thermal issue is not an overtemperature issue, the method may proceed to step 422.

In step 422, it is determined whether the thermal issue can be addressed by modifying a power state of the device in the row that is not having the thermal issue.

In one or more embodiments of the invention, the device that is not having the thermal issue is an upstream device from a second device that is having the thermal issue. For example, the second device may be a device in a row that is downstream from the device that is not having the thermal issue.

In one or more embodiments of the invention, the determination is made based on the thermal state of the device that is having the thermal issue. For example, if a thermal state of the device having the thermal issue is significant, modifying the power state of the device that is upstream from the device having the thermal issue may be insufficient to modify the thermal state of device having the thermal issue to address the thermal issue. In other words, the amount of thermal energy being contributed to the device having the thermal issue by the device that is generating the thermal energy upstream of the device having the thermal issue may not be so great as to control the thermal state of the device having the thermal issue.

If it is determined that the thermal issue can be addressed by modifying the power state of the device in the row that is not having the thermal issue, the method may proceed to step 424. If it is determined that the thermal issue cannot be addressed by modifying the power state of the device in the row that is not having the thermal issue, the method may proceed to step 428.

In step 424, it is determined whether the power state of the device in the row that is not having the thermal issue can be modified without impacting the functionality of the device in the row. For example, in some cases the device in the row that is not having the thermal issue may need to be in a particular power state (e.g., power consumption rate) to provide its functionality. The determination may be made, for example, by sending a request to the device that is not having the thermal issue with respect to its need for power consumption for its functionality. The device may respond by indicating whether its power state may, or may not, be modified while maintaining its functionality.

For example, if the device that is not having the thermal issue includes a battery that needs to be charged to provide its functionality, modifying the power state of the device to prevent it from charging its battery may prevent the device from providing its functionality. In another example, if the device that is not having the thermal issue includes a hardware component that requires continuous power consumption to provide its functionality, modifying the power state of the device to prevent it from providing continuous power to the hardware component may prevent the device from providing its functionality.

If it is determined that the power state of the device in the row that is not having the thermal issue can be modified without impacting its functionality, the method may proceed to step 426. If it is determined that the power state of the device in the row that is not having the thermal issue cannot be modified without impacting its functionality, the method may proceed to step 428.

In step 426, the power state of the device in the row that is not having the thermal issue is modified. In one or more embodiments of the invention, the power state of the device is modified to decrease its power consumption rate.

For example, if the device includes a battery that is being charged, the power state of the device may be modified by preventing the battery from continuing to be charged. By doing so, the thermal energy generation rate due to power consumption may be reduced.

The method may end following step 426.

Returning to step 424, the method may proceed to step 428 following step 424 if the power state of the device may not be modified without impacting functionality of the device in the row.

In step 428, the power state of the device having the thermal issue is modified.

In one or more embodiments of the invention, modifying the power state of the device decreases the power consumption rate of the device. For example, instructions may be sent to the device that cause the device to decrease its power consumption rate.

The method may end following step 428.

Figure 5:
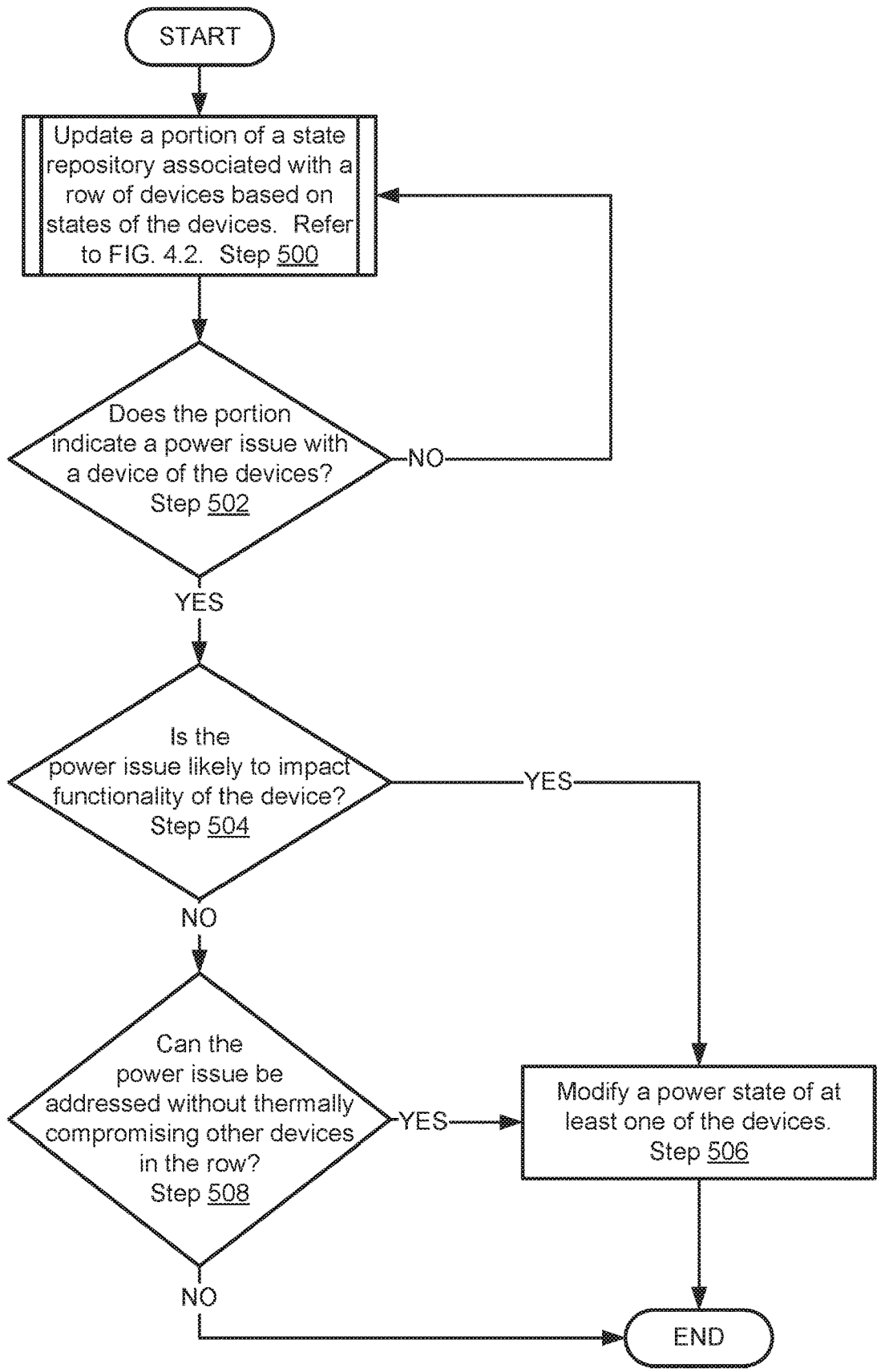
FIG. 5 shows a flowchart of a method of managing a power state in accordance with one or more embodiments of the invention.

Thus, via the methods illustrated in FIGS. 4.1-4.3, thermal states of devices in a row may be managed by modifying gas flow rate and/or power states. However, such modifications may impact the ability of devices to perform their functionality due to power consumption restrictions imposed by the power states. FIG. 5 shows a method that may be used to comply with power states imposed on devices while enabling the devices to provide their functionality.

As discussed with respect to FIG. 4.1, the power state of at least one device in a row of devices may be modified when performing the method of FIG. 4.1. FIG. 5 shows a flowchart of a method of modifying the power state of devices in a row in accordance with one or more embodiments of the invention. The method depicted in FIG. 5 may be used to update a portion of a state repository in accordance with one or more embodiments of the invention. The method shown in FIG. 5 may be performed completely, or in part, by, for example, data processing devices (e.g., 102, FIG. 1.1). Other components of the system illustrated in FIG. 1.1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a portion of the state repository associated with a row of devices is updated based on the states of the devices.

In one or more embodiments of the invention, the remote devices are disposed in an internal volume of the data processing device.

In one or more embodiments of the invention, the portion of the state repository is updated by modifying the portion of the state repository to match the states of the devices. States of the devices may be obtained by, for example, sending a request to the devices for the states of the devices. The states of the devices may be the thermal states of the devices. The thermal state of a device may be a temperature of the device.

In one or more embodiments of the invention, all, or a portion, of the devices are electromagnetic interference emitting devices. All, or a portion, of the electromagnetic interference emitting devices may include a battery. When performing one or more functionalities of the electromagnetic interference emitting devices, electromagnetic interference emitting devices may be powered using the battery. For example, to test the functionality of the electromagnetic interference emitting devices, the battery may be used to power the electromagnetic interference emitting devices during the testing to simulate likely actual-use conditions.

Updating the portion of the state repository may provide an updated state repository. For example, the updated state repository may include up to date information regarding the actual states which are reflected in the state repository.

In one or more embodiments of the invention, the portion of the state repository is updated via the method illustrated in FIG. 4.2. The portion of the state repository may be updated via other methods without departing from the invention.

In step 502, it is determined whether the portion of the updated state repository indicates a power issue with the device of the devices. For example, the power issue may be that a charge level of a battery of the device is below predetermined criteria. Predetermined criteria may be a predetermined fraction of the charge capacity of the battery. The determination may be made by comparing information included in the portion of the updated state repository to the predetermined criteria.

If it is determined that the portion does not indicate any power issue with the devices exists, the method may proceed to step 500. If it is determined that the portion does indicate a power issue with the device exists, the method may proceed to step 504.

In step 504, is determined whether the power issue is likely to impact the functionality of the device. The power issue may be likely to impact the functionality of the device if the power issue relates to an inability of the device to function should the power issue continue to the future.

For example, if the power issue is a charge level of the battery that powers the device when it performs its functionality, the charge level may likely impact the functionality of the device if the charge level meets the second criteria. The second criteria may be, for example, a minimum amount of charge required for performance of the functionality. The determination may be made by comparing information included in the portion of the updated state repository to the second predetermined criteria.

If it is determined that the power issue is likely to impact the functionality of the device, the method may proceed to step 506. If it is determined that the power issue is unlikely to impact the functionality of the device, the method may proceed to step 508.

In step 506, a power state of at least one of the devices is modified. In one or more embodiments of the invention, modifying the power state of the at least one of the devices causes the at least one of the devices to begin charging its battery.

In one or more embodiments of the invention, modifying the power state of the at least one of the devices increases the power consumption rate of the at least one of the devices. The at least one of the devices may be the device having the power issue. At least one of the devices may include other devices in the row that includes the device having the power issue.

The method may end following step 506.

Returning to step 504, the method may proceed to step 508 following step 504 if it is determined that the power issue is not likely to impact the functionality of the device.

In step 508, it is determined whether the power issue can be addressed without thermally compromising other devices in the row.

As discussed above, power consumption by an upstream device in a row may impact the dermal state of downstream devices in the row. Consequently, modifying a power state of a device to address the power issue may thermally compromise other devices in the row.

In one or more embodiments of the invention, the determination is made based on information included in the updated state repository. As discussed above, the updated state repository may include information that reflects the thermal states of the devices in the row. The thermal states of the devices in the row may be compared to the predicted amount of thermal energy that may be generated due to change in power consumption of an upstream device in the row that may be made to address the power issue to determine whether changing the power consumption (and corresponding power state of the upstream device) of the upstream device is likely to compromise the thermal state of the other device (e.g., downstream devices) in the row.

If it is determined that the power issue may be addressed without thermally compromising other devices in the row, the method may proceed to step 506. If it is determined that the power issue may not be addressed without thermally compromising of the devices in the row, the method may end following step 508.

Thus, via the method illustrated in FIG. 5, a data processing device may manage the power states of devices disposed within the data processing device to maintain the functionality of the devices while limiting the potential for thermally compromising one or more of the devices.

Figure 6:
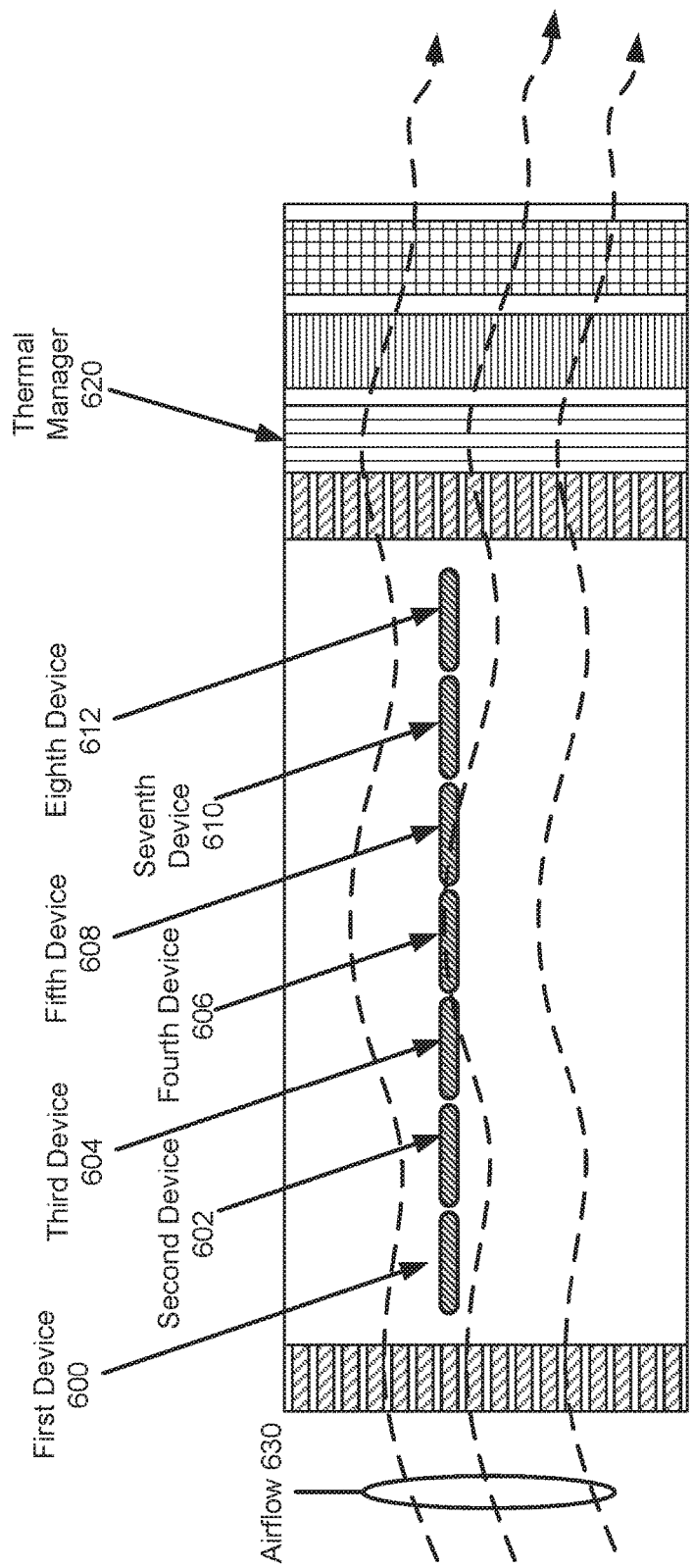
FIG. 6.1 shows a diagram of an example data processing device.

To further clarify aspects of embodiments of the invention, a nonlimiting example is provided in FIGS. 6.1-6.6. FIG. 6.1 shows a diagram of an example data processing device and FIGS. 6.2-6.6 show diagrams of a state repository representing the state of the example data processing device and/or other devices over a period of time. The example data processing device of FIG. 6.1 may be similar to that of FIG. 2.4. For the sake of brevity, only a limited number of components of the example data processing device of FIG. 2.4 are illustrated in FIG. 6.1.

Example

Consider a scenario as illustrated in FIG. 6.1 in which a data processing device houses a number of devices (600, 602, 604, 606, 608, 610, 612). The devices may be arranged within the data processing device in a row. The row may be aligned with an gas flow (630) that causes some of the data processing devices (e.g., 600) to be upstream of other data processing devices (e.g., 602).

The data processing device may include a thermal manager (620) that is similar to the thermal manager discussed with respect to FIG. 3. The thermal manager (620) may manage thermal states of the respective devices.

To manage the thermal states of the devices, the thermal manager (620) may maintain a state repository as described with respect to FIG. 3. FIGS. 6.2-6.6 show diagrams of portions of information included in the state repository as the data processing device performs its functionality.

FIG. 6.2 shows a first diagram of information included in the state database. The first diagram represents the information included in the state database at a first period in time. As seen from FIG. 6.2, all of the devices were in a low-power state at the first point in time. Consequently, the thermal states for the respective devices indicate a low thermal state of 22° C. Because of the low thermal states of the respective devices, the maximum number of devices that may be allowed to enter a high-power state concurrently is restricted to 3 as indicated by of FIG. 6.2.

At a second point in time, a portion of the devices enter a high-power state to charge batteries of the respective devices as seen in FIG. 6.3. Specifically, as seen in rows two and four of FIG. 6.3, which correspond to the second device (602) and the fourth device (606), the second device (602) and the fourth device (606) entered a high power state. Consequently, both of these devices began generating thermal energy which impacted the thermal states of all of the devices in the row as seen from column 3 of the table of FIG. 6.3. However, the elevated thermal states of the devices did not trigger the thermal manager to limit the maximum number of devices that may concurrently enter a high power state as indicated by the fourth column which indicates that the maximum number of concurrently allowed high power state devices is still 3.

At a third point in time, as illustrated in FIG. 6.4, three of the devices enter high-power state which significantly impacts the thermal states of all of the devices. Specifically, the first device (600), the second device (602), and the fourth device (606) are in high-power state at the third point in time. Due to the large amount of thermal energy generated by these devices, the corresponding thermal states of all the devices have significantly increased. In particular, the thermal state of the third device (604), which is downstream of the first device (600) and the second device (602), was significantly elevated and exceeded the maximum allowable thermal state. Consequently, the thermal management system decreased the maximum allowable concurrently high-power estate devices to 2, as seen from column 4 of FIG. 6.4.

At a fourth point in time, as illustrated in FIG. 6.5, the fourth device (606) enters a low-power state and the sixth device (610) attempts to enter a high-power state. However, because the thermal states of the devices, in particular the thermal state of the third device (604), have not significantly decreased, the thermal management system has not increased the maximum allowable concurrent high-power state devices from 2. Consequently, the sixth device (610) is not allowed to enter a high power state and only the first device (600) and the second device (602) are allowed to be in a high power state.

At a fifth point in time, as illustrated in FIG. 6.6, the thermal states of the devices have significantly decreased to below the maximum allowable thermal state. Consequently, the thermal management system has increased the maximum allowable concurrent high-power state devices to 3 devices. Consequently, the sixth device (610) is allowed to enter into a high power state while the first device (600) and second device (602) continue to be in a high power state.

End of Example

Thus, as illustrated via FIGS. 6.1-6.6, a data processing device in accordance with embodiments of the invention may selectively control the power states of devices within an internal volume to manage the thermal states of the devices.

Figure 7:
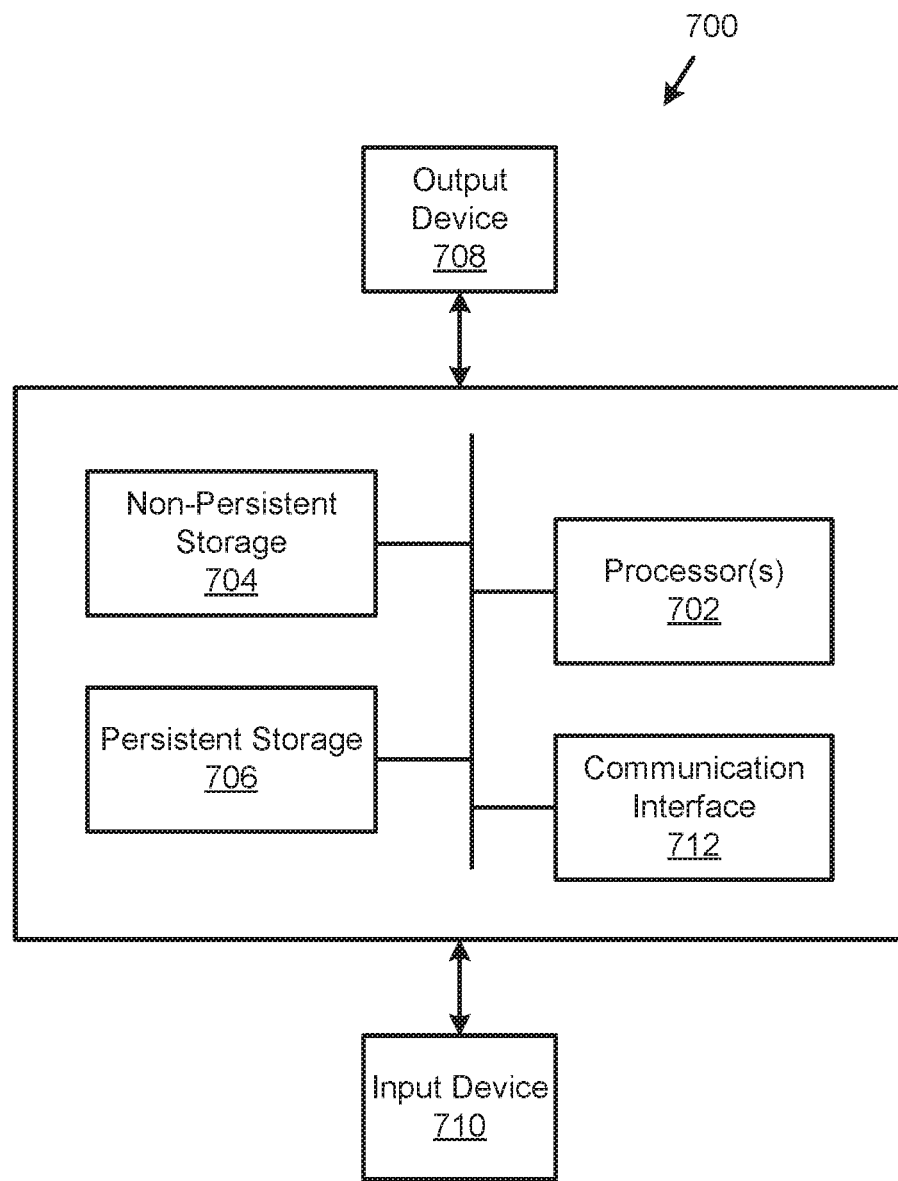
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a method, system, and device for managing electromagnetic interference, power states, and thermal states of devices disposed within an electromagnetically isolated volume. A system in accordance with embodiments of the invention may manage electromagnetic interference at a data processing device level. That is, such devices may include functionality to limit the propagation of electromagnetic interference from within data processing devices to an ambient environment surrounding the data processing device. By doing so, such data processing devices may be used in a high-density environment without negatively impacting the functionality of the high-density environment.

A data processing device in accordance with embodiments of the invention may manage the power states of devices concurrently with the thermal states of the devices. When disposed in an electromagnetically isolated volume, such devices may be prone to entering undesirable thermal states due to limitations on extraction of thermal energy by flows of gasses. To improve the management of such states, the power states of the devices may be selectively limited to facilitate thermal management via limited gas flows. By doing so, such devices may be utilized in an electromagnetically isolated volume without negatively impacting their functionality due to entering the undesirable thermal states.

Thus, embodiments of the invention may address the problem electromagnetic interference within a high-density environment. Specifically, embodiments of the invention may provide a data processing device level solution that facilitates granular control of electromagnetic interference and thermal states of devices in the aforementioned environments to facilitate their integration into the environments.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data processing device, comprising:
 an internal volume for housing devices, wherein the internal volume is adapted to electromagnetically isolate the devices from an ambient environment;
 a persistent storage for storing a state repository; and
 a state manager programmed to:
  update a portion of the state repository associated with a row of the devices based on states of the devices to obtain an updated state repository;
  make a first determination that the portion indicates a thermal issue;

in response to the first determination:
    make a second determination that the thermal issue cannot be addressed using a gas flow; and
    in response to the second determination:
        modify a power state of at least one of the devices in the row to address the thermal issue.

2. The data processing device of claim 1, wherein the state manager is further programmed to:
make a third determination that the portion indicates a second thermal issue;
in response to the third determination:
    make a fourth determination that the thermal issue can be addressed using the gas flow;
    in response to the fourth determination:
        increasing a flow rate of the gas flow.

3. The data processing device of claim 1, wherein updating the portion of the state repository associated with the row of devices based on states of the devices comprises:
modifying a maximum number of allowable charging devices specified by the state repository based on temperatures of the devices and a predetermined temperature,
wherein the maximum number of allowable charging devices specifies a number of the devices that may be simultaneously charging at any point in time.

4. The data processing device of claim 1, wherein the at least one device is associated with the thermal issue.

5. The data processing device of claim 4, wherein the thermal issue is a temperature of the at least one device exceeding a maximum allowable predetermined temperature.

6. The data processing device of claim 4, wherein modifying the power state of the device comprises:
terminating consumption of a portion of power being consumed by the device.

7. The data processing device of claim 6, wherein the portion of the power is used to charge a battery of the device.

8. The data processing device of claim 7, wherein the device is an electromagnetic interference emitting device.

9. The data processing device of claim 7, wherein the device is a portable electronic device.

10. The data processing device of claim 1, wherein the state manager is further programmed to:
make a third determination that the portion of the updated state repository indicates a power issue of a second device of the devices;
in response to the third determination:
    make a fourth determination that the power issue is unlikely to impact functionality of the device;
    in response to the fourth determination:
        make a fifth determination that the power issue can be addressed without thermally compromising other devices in the row; and
        in response to the fourth determination:
            modifying a power state of the second device to address the power issue.

11. The data processing device of claim 10, wherein the power issue is a low power state of a battery of the second device.

12. The data processing device of claim 11, wherein modifying the power state of the second device to address the power issue comprises initiating charging of the battery.

13. The data processing device of claim 10, wherein making the fifth determination that the power issue can be addressed without thermally compromising the other devices in the row comprises:
determining whether a number of the devices that are charging is larger than a maximum allowable number of the devices that may be simultaneously charging.

14. The data processing device of claim 13, wherein the maximum allowable number of the devices that may be simultaneously charging is based on corresponding thermal states of each of the devices.

15. The data processing device of claim 1, wherein the state repository comprising information regarding:
thermal states of the devices;
power states of the devices;
operating states of gas flow control components of the data processing device; and
maximum allowable numbers of devices in respective rows that are allowed to simultaneously charge power components of the respective devices.

16. A method for managing a data processing device, comprising:
updating a portion of a state repository associated with a row of devices, disposed in the data processing device, based on states of the devices to obtain an updated state repository;
making a first determination that the portion indicates a thermal issue;
in response to the first determination:
    making a second determination that the thermal issue cannot be addressed using a gas flow; and
    in response to the second determination:
        modifying a power state of at least one of the devices in the row to address the thermal issue,
wherein the data processing device comprises an internal volume for housing the devices,
wherein the internal volume is adapted to electromagnetically isolate the devices from an ambient environment.

17. The method of claim 16, wherein updating the portion of the state repository associated with the row of devices based on states of the devices comprises:
modifying a maximum number of allowable charging devices specified by the state repository based on temperatures of the devices and a predetermined temperature,
wherein the maximum number of allowable charging devices specifies a number of the devices that may be simultaneously charging at any point in time.

18. The method of claim 16, further comprising:
making a third determination that the portion of the updated state repository indicates a power issue of a second device of the devices;
in response to the third determination:
    making a fourth determination that the power issue is unlikely to impact functionality of the device;
    in response to the fourth determination:
        making a fifth determination that the power issue can be addressed without thermally compromising other devices in the row; and
        in response to the fourth determination:
            modifying a power state of the second device to address the power issue.

19. A non-transitory computer readable medium storing computer instructions that, when executed by a processor, cause a data processing device to perform a method, the method comprising:
updating a portion of a state repository associated with a row of devices, disposed in the data processing device, based on states of the devices to obtain an updated state repository;

making a first determination that the portion indicates a thermal issue;
in response to the first determination:
  making a second determination that the thermal issue cannot be addressed using a gas flow;
  in response to the second determination:
    modifying a power state of at least one of the devices in the row to address the thermal issue,
wherein the data processing device comprises an internal volume for housing the devices,
wherein the internal volume is adapted to electromagnetically isolate the devices from an ambient environment.

20. The non-transitory computer readable medium of claim 19, wherein updating the portion of the state repository associated with the row of devices based on states of the devices comprises:
modifying a maximum number of allowable charging devices specified by the state repository based on temperatures of the devices and a predetermined temperature,
wherein the maximum number of allowable charging devices specifies a number of the devices that may be simultaneously charging at any point in time.

* * * * *